United States Patent
Takahashi et al.

(10) Patent No.: US 12,254,348 B2
(45) Date of Patent: Mar. 18, 2025

(54) INFORMATION PROCESSING APPARATUS, INFORMATION PROCESSING METHOD, AND RECORDING MEDIUM FOR PERFORMING INFERENCE PROCESSING USING AN INFERENCE MODEL

(71) Applicant: Panasonic Intellectual Property Management Co., Ltd., Osaka (JP)

(72) Inventors: Masaki Takahashi, Osaka (JP); Yohei Nakata, Osaka (JP); Yasunori Ishii, Osaka (JP); Tomoyuki Okuno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 42 days.

(21) Appl. No.: 18/090,639

(22) Filed: Dec. 29, 2022

(65) Prior Publication Data

US 2023/0133989 A1 May 4, 2023

Related U.S. Application Data

(63) Continuation of application No. PCT/JP2021/019553, filed on May 24, 2021.

(30) Foreign Application Priority Data

Jul. 10, 2020 (JP) .................................. 2020-119205

(51) Int. Cl.
*G06F 9/48* (2006.01)
(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

2004/0216098 A1* 10/2004 Roe ....................... G06F 9/5038
717/161
2017/0368682 A1 12/2017 Danjo et al.
(Continued)

FOREIGN PATENT DOCUMENTS

| JP | 2018-5297 | 1/2018 |
|---|---|---|
| JP | 2018-190045 | 11/2018 |

OTHER PUBLICATIONS

International Search Report (ISR) issued on Aug. 24, 2021 in International (PCT) Application No. PCT/JP2021/019553.
(Continued)

*Primary Examiner* — Michael J Metzger
(74) *Attorney, Agent, or Firm* — Wenderoth, Lind & Ponack, L.L.P.

(57) ABSTRACT

An information processing apparatus includes: an obtainer that obtains sensing data; a common neutral network (NN) that inputs the sensing data into an inference model to obtain a result of inference and information on a processing time for a plurality of tasks subsequent to the processing performed by the inference model; and an NN inference computation management unit that determines a task schedule for a task processing unit that processes the plurality of subsequent tasks to process the plurality of subsequent tasks on the basis of the information on the processing time for the plurality of subsequent tasks and inputs the result of the inference into the task processing unit to process the plurality of subsequent tasks according to the determined task schedule.

15 Claims, 12 Drawing Sheets

(56) References Cited

U.S. PATENT DOCUMENTS

| | | | |
|---|---|---|---|
| 2018/0365576 A1* | 12/2018 | Guttmann | G06F 7/14 |
| 2019/0045207 A1* | 2/2019 | Chen | H04N 19/46 |
| 2020/0143670 A1 | 5/2020 | Kitani et al. | |
| 2020/0219015 A1 | 7/2020 | Lee et al. | |
| 2021/0374547 A1* | 12/2021 | Wang | G06N 3/047 |

OTHER PUBLICATIONS

Extended European Search Report issued Jul. 21, 2023 in corresponding European Patent Application No. 21837781.0.

* cited by examiner

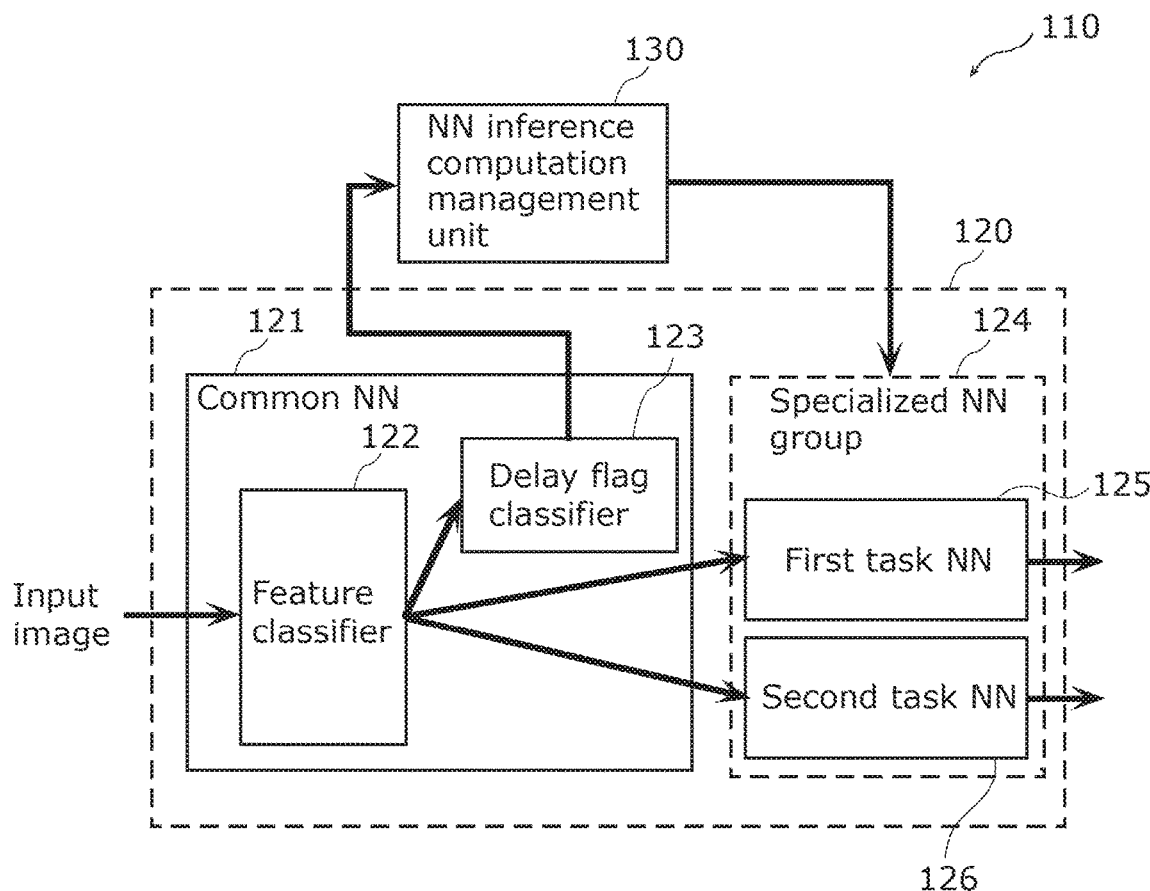

FIG. 13

| Delay flag information | Occurrence rate |
|---|---|
| OFF | 80% |
| ON1 | 15% |
| ON2 | 5% |
| NG | 0% |

INFORMATION PROCESSING APPARATUS, INFORMATION PROCESSING METHOD, AND RECORDING MEDIUM FOR PERFORMING INFERENCE PROCESSING USING AN INFERENCE MODEL

CROSS REFERENCE TO RELATED APPLICATIONS

This is a continuation application of PCT International Application No. PCT/JP2021/019553 filed on May 24, 2021, designating the United States of America, which is based on and claims priority of Japanese Patent Application No. 2020-119205 filed on Jul. 10, 2020. The entire disclosures of the above-identified applications, including the specifications, drawings and claims are incorporated herein by reference in their entirety.

FIELD

The present disclosure relates to an information processing apparatus, an information processing method, and a recording medium.

BACKGROUND

In recent years, there have been proposed various apparatuses each carrying an inference model that employs a neural network (hereinafter, the neural network is referred to as an NN, and the inference model is referred to as an NN inference model or simply an NN). For example, it has been proposed to install an NN inference model in an Internet of Things (IoT) device, which is generally required to be inexpensive and to operate with low power, which limits its calculation capability. For example, Patent Literature (PTL) 1 discloses an NN apparatus and the like capable of reducing the power consumption of the entire apparatus while maintaining high accuracy by causing an NN inference model to execute inference at a drive frequency corresponding to the accuracy, the amount of calculation, and the like required for each layer of the NN inference model.

CITATION LIST

Patent Literature

PTL 1: Japanese Unexamined Patent Publication No. 2018-005297

SUMMARY

Technical Problem

However, PTL 1 discloses only a technique for inference processing of a single inference model.

Therefore, the present disclosure provides an information processing apparatus, an information processing method, and a program that can perform inference processing using a plurality of inference models even in a limited calculation environment.

Solution to Problem

An information processing apparatus according to one aspect of the present disclosure includes: an obtainer that obtains sensing data; an inference processing unit that inputs the sensing data into an inference model to obtain a result of inference and information on a processing time for a plurality of subsequent tasks to processing performed by the inference model; a determiner that determines a task schedule for a task processing unit that processes the plurality of subsequent tasks to process the plurality of subsequent tasks on the basis of the information on the processing time for the plurality of subsequent tasks; and a controller that inputs the result of the inference into the task processing unit to process the plurality of subsequent tasks according to the task schedule determined.

An information processing method according to one aspect of the present disclosure is a method executed by a computer, the method including: obtaining sensing data; inputting the sensing data into an inference model to obtain a result of inference and information on a processing time for a plurality of subsequent tasks to processing performed by the inference model; inputting the result of the inference into a task processing unit that processes the plurality of subsequent tasks to process the plurality of subsequent tasks; measuring an inference time including a time from the inputting of the result of the inference into the task processing unit until an end of the processing of the plurality of subsequent tasks; and training the inference model by machine learning using the sensing data as input data, the information on the processing time for the plurality of subsequent tasks as output data, and the inference time measured as reference data.

A recording medium according to one aspect of the present disclosure is a non-transitory computer-readable recording medium having recorded thereon a program for causing a computer to execute the information processing method.

Advantageous Effects

According to one aspect of the present disclosure, it is possible to achieve an information processing apparatus and the like that can perform inference processing using a plurality of inference models even in a limited calculation environment.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a block diagram showing a functional configuration of an inference processing unit according to the embodiment.

FIG. 3 is a diagram showing an example of a configuration of a table including delay flag information and forward propagation computation methods for a specialized NN group associated with the delay flag information according to the embodiment.

FIG. 13 is a table showing the occurrence rate of delay flag information according to the embodiment.

Figure 1:
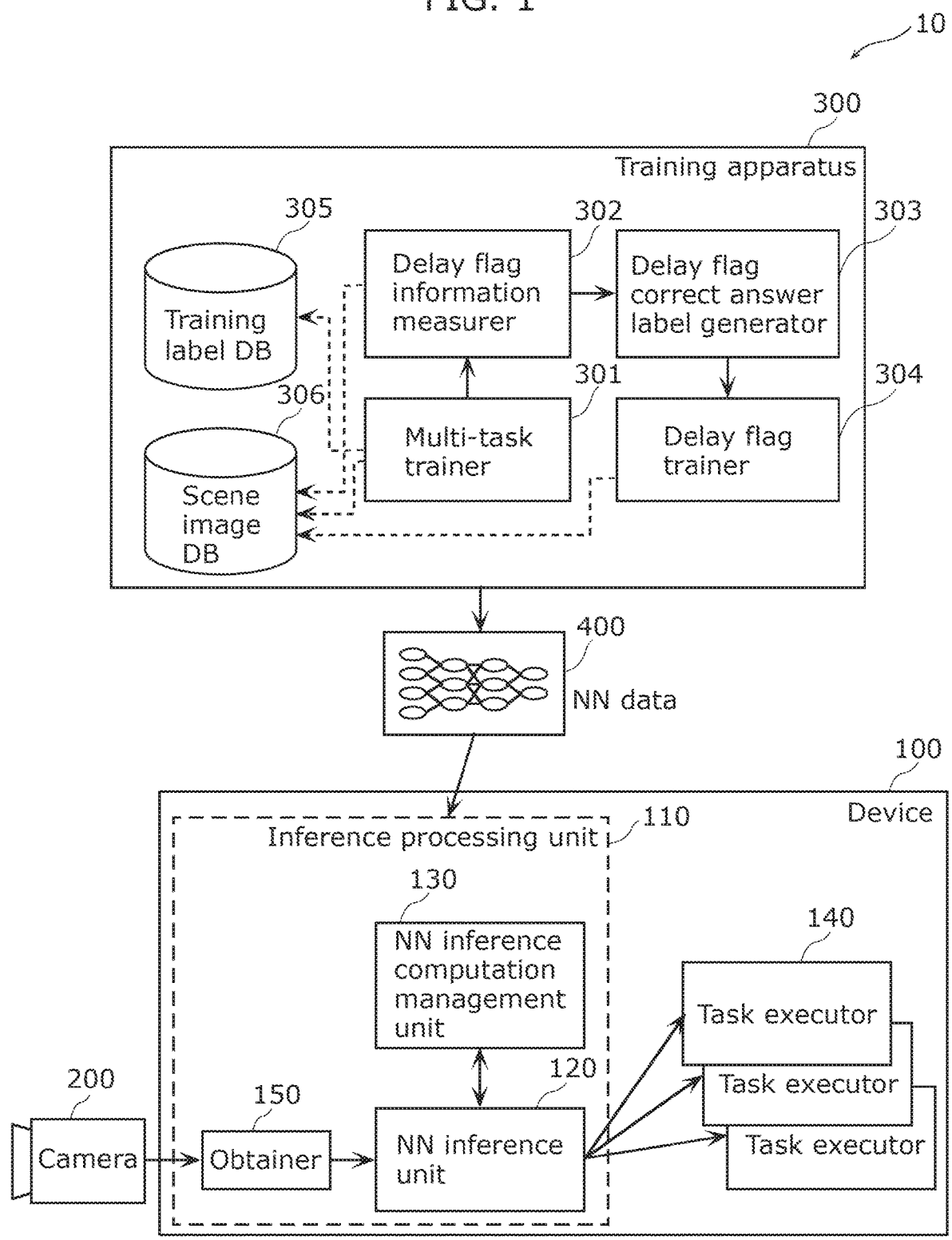
FIG. 1 is a block diagram showing a functional configuration of an information processing system according to an embodiment.

DESCRIPTION OF EMBODIMENTS (Underlying Knowledge Forming Basis of the Present Disclosure)

Circumstances leading to the present disclosure will be described before the description of exemplary embodiments of the present disclosure.

The present disclosure relates to an apparatus (hereinafter referred to as an inference apparatus) carrying an inference model that is generated using machine learning. More specifically, the present disclosure relates to an NN-type inference apparatus, enabling the maintenance of the service quality by changing a computation order, and relates to training processing therefor.

In recent years, the performance of an object detection apparatus, a classification apparatus, and the like among inference apparatuses has been dramatically improved by the adoption of deep learning technology, and numerous research or commercialization efforts are underway. In a smartphone or an autonomous vehicle (robot car) driven by a machine instead of a diver, an inference apparatus for an image transferred from a camera apparatus, an infrared array sensor, or the like is one of element functions. In the case of the autonomous vehicle, an object means, for example, a pedestrian, a passenger car, a road sign, a building, a road area, or the like.

Further, the field of edge artificial intelligence (AI), in which an NN inference model is installed in an Internet of Things (IoT) device and the device operates in accordance with the determination of the IoT device itself rather than always causing the cloud to perform determination, has recently begun to come into proliferation. For example, in the fields of various industrial products including the IoT device, industrial products, which are mounted with NN-type inference apparatuses and perform services on the basis of the inference results of the devices, have been put on the market. The IoT device is generally required to be inexpensive and to operate with low power, which limits its calculation capability.

The IoT device is required to save power. In a case where a service using a plurality of NN inference models is performed in such an IoT device, it is difficult to complete the service within a required processing time unless computation for inferring the plurality of NN inference models in parallel is performed. As described above, for example, in the IoT device, it is assumed that computation for inference is performed using a plurality of NN inference models provided in parallel. Note that the required processing time is also referred to as an allowable time.

Further, an NN processing dedicated circuit called a neural network processing unit (NPU), which is mounted with a digital signal processor (DSP), an application-specific integrated circuit (ASIC), and the like, has begun to be installed in the IoT device separately from a central processing unit (CPU). However, a service required for the IoT device has come to use inference processing of a plurality of NNs as described above, and the amount of processing for the service tends to increase.

The IoT device is required to save power in addition to completing the service within the required processing time. Thus, the IoT device is prone to a problem of being unable to complete the inference processing within the required processing time, depending on the input image.

Note that the service using a plurality of NN inference models includes, for example, processing of determining that a target person present in a scene image has "something" in the right hand by inference processing of a skeleton detecting NN inference model and determining that "something" is a smartphone by inference processing of an object detecting NN inference model.

PTL 1 mentioned above discloses a method assuming a service using inference processing of a single NN inference model and does not disclose a method related to the ensuring of a processing time in a service using inference processing of a plurality of NN inference models. Further, no consideration has hitherto been given to a design and a technical solution related to processing of estimating a processing time necessary for inference processing of a plurality of inference models at an initial stage and performing inference processing in an optimum computation order within a required processing time, which is not disclosed in PTL 1, either.

Therefore, an intensive study has been conducted on an information processing apparatus and the like capable of performing inference processing within a required processing time in a service using inference processing of a plurality of NN inference models, and an information processing method and the like described below have been devised.

An information processing apparatus according to one aspect of the present disclosure includes: an obtainer that obtains sensing data; an inference processing unit that inputs the sensing data into an inference model to obtain a result of inference and information on a processing time for a plurality of subsequent tasks to processing performed by the inference model; a determiner that determines a task schedule for a task processing unit that processes the plurality of subsequent tasks to process the plurality of subsequent tasks on the basis of the information on the processing time for the plurality of subsequent tasks; and a controller that inputs the result of the inference into the task processing unit to process the plurality of subsequent tasks according to the task schedule determined.

With this, the information processing apparatus can determine a task schedule for a task processing unit (for example, a plurality of NN inference models) that processes a plurality of subsequent tasks on the basis of information on a processing time for the plurality of subsequent tasks with respect to a sensing data. By determining the task schedule so that the processing time of the task processing unit is within a required processing time on the basis of the information on the processing time for the plurality of subsequent tasks, the information processing apparatus can perform inference processing using the plurality of inference models even in a limited calculation environment.

Further, for example, the inference model may include a first inference model and a second inference model, the sensing data may be input into the first inference model to obtain the result of the inference, and the result of the inference obtained or intermediate data of the inference may be input into the second inference model to obtain the information on the processing time for the plurality of subsequent tasks.

With this, it is possible to make the amount of calculation of the second inference model less than that in a case where the sensing data is input into the second inference model. Hence it is possible to shorten the processing time in the second inference model. When the result of the inference is input, the input of the second inference model is the same as the input of the subsequent task processing unit, so that it is expected that the precision or accuracy of the information on the processing time of the subsequent task processing unit is improved. When the intermediate data of the inference is input, the processing of the second inference model can be started before the end of the inference of the first inference model, thereby further shortening the processing time of the second inference model.

Further, for example, the inference model may include a first inference model and a second inference model, the sensing data may be input into the first inference model to obtain the result of the inference, and the result of the inference obtained or intermediate data of the inference may be input into the second inference model to obtain the information on the processing time for the plurality of subsequent tasks.

With this, it is possible to start the processing of the second inference model by using the sensing data without waiting for the result of the inference to be output from the first inference model. In other words, it is possible to accelerate the start timing of the processing of the second inference model.

Further, for example, the information on the processing time for the plurality of subsequent tasks may include information on a delay relative to a predetermined time that is determined with respect to the processing time for the plurality of subsequent tasks.

With this, it is possible to determine the task schedule for the task processing unit on the basis of the information on the delay. The information processing apparatus determines the task schedule so that the processing time of the task processing unit is within the required processing time on the basis of the information on the delay of the plurality of subsequent tasks, thus increasing the certainty that in the service using the inference processing of the plurality of inference models, the inference processing can be performed within the required processing time.

Further, for example, a first schedule may be determined when information indicating that the delay is less than a predetermined value is included in the information on the delay, and a second schedule, in which the processing time for the plurality of subsequent tasks is shorter than in the first schedule, may be determined when information indicating that the delay is greater than or equal to the predetermined value is included in the information on the delay.

With this, when the delay is greater than or equal to the predetermined value, the second schedule having a shorter processing time is determined, thus increasing the certainty that the inference processing can be performed within the required processing time.

Further, for example, the first schedule may be determined using a first rule, and the second schedule may be determined using a second rule with which the processing time for the plurality of subsequent tasks in the second schedule is shorter than in the first schedule.

With this, the schedule is determined based on the first and second rules, whereby it is possible to reduce the amount of calculation and the calculation time as compared to a case where a schedule is searched for dynamically.

Further, for example, the inference model may execute inference processing that is preprocessing common to the plurality of subsequent tasks.

With this, the use of the inference model for the preprocessing common to each task can compress the total calculation amount and memory usage amount of the inference processing necessary for each task processing.

Further, for example, the inference model and the task processing unit may be neural network models, the result of the inference may be a feature value of the sensing data, and the task schedule may include an order in which the task processing unit performs memory loading and the processing.

With this, it is possible to apply a high-performance NN inference model in a limited calculation environment such as an IoT device. In addition, the processing time for the subsequent task is inferred based on the feature value of the sensing data, thus facilitating the inference of the processing time corresponding to the difficulty level of the task processing with respect to the sensing data.

An information processing method according to one aspect of the present disclosure is a method executed by a computer, the method including: obtaining sensing data; inputting the sensing data into an inference model to obtain a result of inference and information on a processing time for a plurality of subsequent tasks to processing performed by the inference model; inputting the result of the inference into a task processing unit that processes the plurality of subsequent tasks to process the plurality of subsequent tasks; measuring an inference time including a time from the inputting of the result of the inference into the task processing unit until an end of the processing of the plurality of subsequent tasks; and training the inference model by machine learning using the sensing data as input data, the information on the processing time for the plurality of subsequent tasks as output data, and the inference time measured as reference data. A recording medium according to one aspect of the present disclosure is a non-transitory computer-readable recording medium having recorded thereon a program for causing a computer to execute the information processing method described above.

With this, it is possible to generate an inference model that achieves the processing executed by the information processing apparatus. The inference processing is performed using the generated inference model, whereby it is possible to determine the task schedule so that the processing time of the task processing unit is within the required processing time on the basis of the information on the processing time for the plurality of subsequent tasks.

Moreover, these generic or specific aspects may be achieved using a system, an apparatus, a method, an integrated circuit, a computer program, or a non-temporary storage medium such as a computer-readable compact disc read-only memory (CD-ROM), or may be implemented using any combination of systems, apparatuses, methods, integrated circuits, computer programs, and storage media.

Hereinafter, specific examples of an information processing apparatus and the like according to one aspect of the present disclosure will be described with reference to the drawings. Each of the exemplary embodiments described here shows a specific example of the present disclosure. Therefore, the numerical values, components, steps, the order of steps, and the like shown in the following exemplary embodiments are examples and are not intended to limit the present disclosure. Among the components in the following exemplary embodiments, components not recited in independent claims are described as optional components. In all the exemplary embodiments, the respective contents can be combined.

Each of the drawings is a schematic diagram and is not necessarily a strict illustration. Thus, for example, the scales or the like are not necessarily coincident with each other in the drawings. In addition, in the drawings, substantially the same components are denoted by the same reference numerals, and duplicated description is omitted or simplified.

In the present specification, a term, as well as a numerical value and a numerical range, indicating a relationship between elements, such as "same" or "coincident", is not an expression expressing only a strict meaning but is an expression meaning to include a substantially equivalent range, for example, a difference of about a few percent.

Embodiment

Hereinafter, an information processing system and the like according to the present embodiment will be described below with reference to FIGS. 1 to 13.

[1. Configuration of Information Processing System]

First, a configuration of information processing system 10 according to the present embodiment will be described with reference to FIGS. 1 to 4. FIG. 1 is a block diagram showing a functional configuration of information processing system 10 according to the present embodiment. FIG. 2 is a block diagram showing a functional configuration of inference processing unit 110 according to the present embodiment.

As shown in FIG. 1, information processing system 10 includes device 100, camera 200, and training apparatus 300. Device 100 performs inference processing on an input image from camera 200 and performs a service corresponding to the result of the inference. Training apparatus 300 generates NN data 400 for device 100 to perform the inference processing. Each component will be described below.

Device 100 is, for example, an IoT device and has a function of providing a plurality of services on the basis of an input image obtained from camera 200. Device 100 includes inference processing unit 110 and task executor 140. The input image obtained from camera 200 is an example of sensing data.

Inference processing unit 110 performs inference processing on the input image input from camera 200 by using NN data 400 generated by training apparatus 300. Inference processing unit 110 performs the inference processing by using a plurality of NNs provided in parallel. In other words, NN data 400 includes a plurality of NNs provided in parallel. Note that NN data 400 stores, for example, the layer configurations, weights, and biases of the NNs.

As shown in FIG. 2, NN data 400 includes common NN 121 and specialized NN group 124. Common NN 121 is an NN for preprocessing in NN data 400, and specialized NN group 124 is an NN group for subsequent processing in NN data 400.

The time required for the inference processing in device 100 may vary depending on the input image. Thus, depending on the input image, the inference processing may take time, and the service may not be performed within the processing time required for device 100. Therefore, inference processing unit 110 obtains an inference result related to the time taken for subsequent inference processing on the input image by using the NN for preprocessing and changes the order of the subsequent inference processing (an example of a task schedule) or the like on the basis of the obtained inference result. The configurations of inference processing unit 110 and the like will be described below.

Inference processing unit 110 includes NN inference unit 120, NN inference computation management unit 130, and obtainer 150. Note that inference processing unit 110 is an inference processing apparatus capable of changing a computation order. It can also be said that inference processing unit 110 is a computation-order variable inference apparatus. Inference processing unit 110 is an example of an information processing apparatus.

NN inference unit 120 performs inference processing on the input image input from camera 200 by using a plurality of NNs based on NN data 400 generated by training apparatus 300.

NN inference unit 120 performs inference processing by using common NN 121 and specialized NN group 124 that includes a plurality of NNs provided in parallel. First, NN inference unit 120 performs forward propagation computation processing by using common NN 121. Common NN 121 is, for example, a forward propagation type NN.

Common NN 121 is an NN that outputs an inference processing result and delay flag information common to the plurality of NNs of specialized NN group 124. Common NN 121 executes inference processing that is preprocessing common to each task. It can also be said that common NN 121 is a model executed as preprocessing common to each task. Common NN 121 includes feature classifier 122 and delay flag classifier 123. Feature classifier 122 and delay flag classifier 123 are trained NNs, for example. Note that common NN 121 is an example of an inference processing unit. The inference processing as preprocessing is not limited to the processing using the NN.

By inputting the input image into feature classifier 122 of common NN 121, NN inference unit 120 obtains an inference processing result that is an output of feature classifier 122. The inference processing result (inference result) is, for example, a feature value (image feature value) but is not limited thereto. An example in which the inference processing result is a feature value will be described below.

Feature classifier 122 is a trained NN (NN for feature classification) trained to receive an input image as an input and output a feature value corresponding to the input image. Feature classifier 122 performs inference processing common to each of the plurality of NNs of specialized NN group 124 to be subjected to forward propagation computation processing. The feature value is information common to each of the plurality of NNs of specialized NN group 124.

NN inference unit 120 outputs a feature value that is an output of feature classifier 122 to each of the plurality of NNs of specialized NN group 124. In the present embodiment, NN inference unit 120 also outputs the feature value to delay flag classifier 123. As described above, the feature value as the output of feature classifier 122 may be used in delay flag classifier 123. In the present embodiment, the same feature value is input into delay flag classifier 123 and each of the plurality of NNs of specialized NN group 124.

NN inference unit 120 inputs the feature value from feature classifier 122 into delay flag classifier 123 to obtain delay flag information that is an output of delay flag classifier 123. Delay flag classifier 123 is a trained NN (NN for delay flag classification) trained to receive a feature value as an input and output delay flag information corresponding to the feature value. The delay flag information is information indicating the time (inference time) including the time from the inputting of the feature value (inference result) into specialized NN group 124 (a task processing unit or a part thereof) until the end of the processing of the plurality of subsequent tasks. For example, the delay flag information is information indicating an inference result as to whether or not the inference processing time of entire NN inference unit 120 exceeds a threshold. It can also be said that the delay flag information is information on a delay relative to a predetermined time (for example, a threshold). The predetermined time is the time determined with respect to the processing time for the plurality of subsequent tasks. The threshold may be set, for example, based on the processing time required for device 100 or the service content of device 100. The threshold is set in advance. Note that the delay flag information may be, for example, information indicating an inference result as to whether or not the processing time of entire device 100 exceeds the threshold. The delay flag information may be, for example, information indicating an inference result as to whether or not the total processing time of NN inference unit 120 and task executor 140 exceeds the threshold.

The delay flag information may be, for example, information indicating "OFF" when the inference processing time is less than or equal to the threshold, or information indicating "ON" when the inference processing time exceeds the threshold. Further, a plurality of "ON" may be set. The delay flag information may be, for example, information indicating "ON1" when the inference processing time exceeds a first threshold and is less than or equal to a second threshold that is greater than the first threshold, and information indicating "ON2" when the inference processing time exceeds the second threshold. The first threshold is, for example, 10 msec, and the second threshold is, for example, 15 msec, but the present disclosure is not limited thereto. The delay flag information is an example of information on the processing time for the plurality of subsequent tasks. The processing time for the plurality of subsequent tasks may be, for example, the processing time of specialized NN group 124, or the total processing time of specialized NN group 124 and task executor 140. In this case, specialized NN group 124 and task executor 140 are examples of a task processing unit.

In the present embodiment, an example will be given of an example in which three levels of "OFF", "ON1" and "ON2" are set as the delay flag information. Note that two levels or four or more levels may be set for the delay flag information.

The delay flag information is not limited to the information indicating the delay level, such as "OFF", "ON1", or "ON2", but may be the processing time (computation time) itself, for example.

Note that delay flag classifier 123 is desired to output delay flag information as soon as possible. Delay flag classifier 123 may thus be an NN having a smaller amount of calculation than feature classifier 122 and specialized NN group 124.

Common NN 121 configured as described above is an example of an inference model that outputs a feature value and delay flag information when receiving input of an input image from camera 200. Feature classifier 122 is an example of a first inference model, and delay flag classifier 123 is an example of a second inference model. That is, the inference model includes the first inference model and the second inference model.

On the basis of the delay flag information from delay flag classifier 123, NN inference computation management unit 130 determines a forward propagation computation method (for example, a computation order) for processing the plurality of tasks of specialized NN group 124 subsequent to common NN 121 and notifies specialized NN group 124 of the determined method. Specifically, NN inference computation management unit 130 notifies NN inference unit 120, which controls the processing of specialized NN group 124, of the determined forward propagation computation method. Thereby, NN inference unit 120 can input the feature value from feature classifier 122 into specialized NN group 124 to process the plurality of subsequent NNs by the determined forward propagation computation method. NN inference computation management unit 130 is an example of a determiner for determining a forward propagation computation method and a controller for causing a task at a later stage.

In the present embodiment, NN inference computation management unit 130 determines a method for the forward propagation computation subsequent to common NN 121 on the basis of the delay flag information and table 500 shown in FIG. 3. FIG. 3 is a diagram showing an example of the configuration of table 500 including the delay flag information and forward propagation computation methods for specialized NN group 124 associated with the delay flag information according to the present embodiment. A parallel computation item in FIG. 3 shows methods for the forward propagation computation subsequent to common NN 121, for example, forward propagation computation methods for specialized NN group 124.

As shown in FIG. 3, the delay flag information "OFF" is associated with a parallel computation item "optimum parallel computation processing" (see first line 501 in FIG. 3), the delay flag information "ON1" is associated with a parallel computation item "delay handling parallel computation processing" (see second line 502 in FIG. 3), and the delay flag information "ON2" is associated with a parallel computation item "delay handling parallel computation processing+CPU overclocking processing" (see third line 503 in FIG. 3). Note that "ON" mentioned here means that the computation time of NN inference unit 120 exceeds the allowable time, and the computation order needs to be changed from the computation order indicated by the "optimum parallel computation processing". The operation order is an example of a task schedule.

The "optimum parallel computation processing" indicates that computation processing is performed in accordance with a parallel computation method (for example, a parallel computation order) determined based on the number of memory accesses, processing time (computation time), power consumption, and the like. For example, when a delay is less than a predetermined value (for example, a delay is less than a threshold), a forward propagation computation order (an example of a first schedule) is determined using the "optimum parallel computation processing". Note that the "optimum parallel computation processing" is an example of a first rule. That the delay is less than the predetermined value includes that there is no delay or that the delay length or the delay degree is less than the predetermined value.

The "delay handling parallel computation processing" indicates that computation processing is performed in accordance with a parallel computation method determined so that the processing time becomes shorter than that for the "optimum parallel computation processing". For example, when the delay is greater than or equal to the predetermined value (for example, the delay is greater than or equal to the threshold), a forward propagation computation order (an example of a second schedule) is determined using the "delay handling parallel computation processing". The parallel computation method is, for example, a method in which the computation order is rearranged so as to preferentially start processing (for example, non-maximum suppression (NMS) processing), the processing time of which changes in accordance with the number of candidate detection areas in the input image, but the present disclosure is not limited thereto. Note that the "delay handling parallel computation processing" is an example of a second rule with which the processing time for the plurality of subsequent tasks is shorter than that in the first rule. That the delay is greater than or equal to the predetermined value includes that there is a delay or that the delay length or the delay degree is greater than or equal to the predetermined value.

Note that NMS is an algorithm that deletes a certain candidate detection area when the degree of overlap (a value of intersection over union (IoU)) between the certain candidate detection area and a candidate detection area having a higher score than the certain candidate detection area exceeds a threshold set by training processing.

The "delay handling parallel computation processing+ CPU overclocking processing" indicates that in addition to the "delay handling parallel computation processing", a setting of a drive frequency of a CPU (for example, CPU 602 shown in FIG. 4 to be described later) is increased. As described above, the delay flag information may include information related to the setting of the drive frequency of the CPU in addition to the change of the computation order of the parallel computation. That is, coping with a delay is not limited to changing the parallel computation but may include changing the setting (for example, the setting of the drive frequency) of each processing unit included in device 100 together with or instead of changing the parallel computation.

Note that the computation order indicated by the "optimum parallel computation processing" and the computation order indicated by the "delay handling parallel computation processing" are set in advance and stored in memory 605 or the like.

As described above, a plurality of types of delay flag information may exist, such as the delay flags "ON1" and "ON2". For example, a plurality of types of delay flag information may exist depending on the result of the processing time measurement performed by delay flag information measurer 302 to be described later.

Specialized NN group 124 includes a plurality of NNs, each of which performs different output on the basis of the feature value from feature classifier 122. In the present embodiment, specialized NN group 124 includes first task NN 125 and second task NN 126. Hereinafter, a description will be given of an example in which first task NN 125 is an object detecting NN and second task NN 126 is a skeleton detecting NN, but the present disclosure is not limited thereto. Further, a description will be given of an example in which first task NN 125 includes NMS processing and second task NN 126 does not include NMS processing, but the present disclosure is not limited thereto. Note that specialized NN group 124 (NN inference unit 120 that performs processing by using specialized NN group 124) is an example of a task processing unit. When the task processing unit includes specialized NN group 124, each of the inference model and the task processing unit is an NN model.

First task NN 125 is a trained NN trained to receive a feature value from feature classifier 122 as an input and output an inference result of object detection corresponding to the feature value. The inference result as an output of first task NN 125 is output to task executor 140 corresponding to first task NN 125.

Second task NN 126 is a trained NN trained to receive a feature value from feature classifier 122 as an input and output an inference result of skeleton detection corresponding to the feature value. The inference result as an output of second task NN 126 is output to task executor 140 corresponding to second task NN 126.

Note that the object detection and the skeleton detection are examples of the plurality of subsequent tasks.

When delay flag classifier 123 outputs delay flag information including "ON1" or "ON2", the computation orders of first task NN 125 and second task NN 126 are changed from when the delay flag information is "OFF". In the present embodiment, at least the computation order in first task NN 125 including the NMS processing is changed from when the delay flag information is "OFF".

NN inference computation management unit 130 instructs NN inference unit 120 to perform forward propagation computation on specialized NN group 124 in accordance with a parallel computation item (parallel computation method) determined based on the delay flag information and table 500, for example. Thus, NN inference computation management unit 130 can change the computation order in accordance with the inference result (delay flag information) related to the time of inference processing of the input image, thus preventing the processing time from becoming long.

Obtainer 150 obtains an input image from camera 200. Obtainer 150 outputs the obtained input image to NN inference unit 120.

Subsequently, task executor 140 executes a preset task on the basis of the inference result of NN inference unit 120. Task executor 140 may be, for example, a display for displaying the inference result, a light emitter for emitting light corresponding to the inference result, or a transmitter for transmitting the inference result to an external device.

Figure 4:
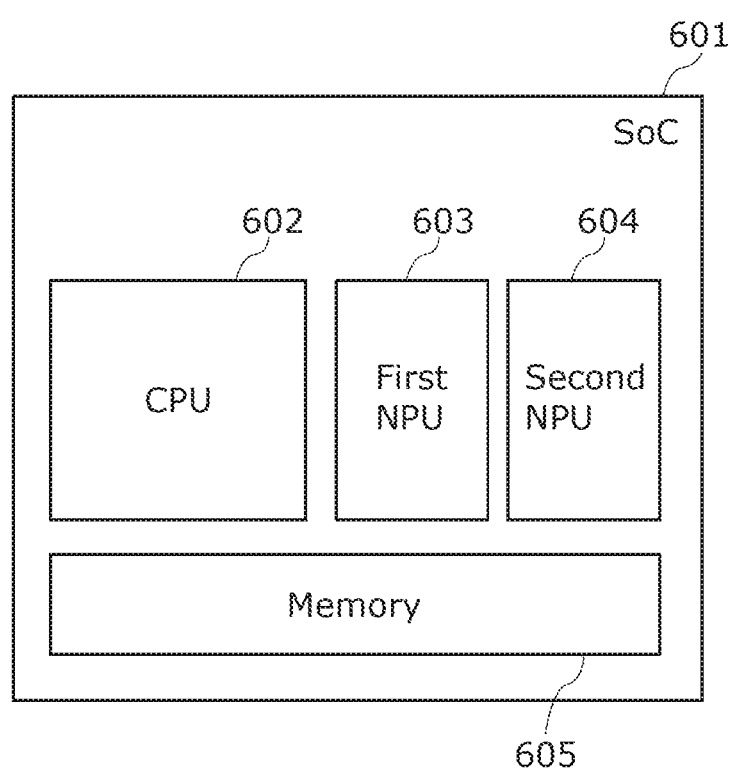
FIG. 4 is a schematic diagram showing a configuration of a system-on-chip (SoC) according to the embodiment.

FIG. 4 is a schematic diagram showing a configuration of system-on-chip (SoC) 601 of device 100 according to the present embodiment. In the present embodiment, an NPU is mounted.

As shown in FIG. 4, SoC 601 includes CPU 602, first NPU 603, second NPU 604, and memory 605. Each function of NN inference unit 120 is achieved by installing a trained NN (NN data 400) on SoC 601.

CPU 602 is a processing unit that executes various types of processing in device 100. CPU 602 executes the NMS processing, the processing of task executor 140, and the like.

First NPU 603 and second NPU 604 are dedicated circuits that perform NN processing. First NPU 603 and second NPU 604 execute NN processing in device 100. First NPU 603 and second NPU 604 execute, for example, processing using common NN 121 and processing using specialized NN group 124. In the present embodiment, first NPU 603 and second NPU 604 execute skeleton detection processing, object detection processing, and delay label determination processing.

Memory 605 stores a program executed by each of CPU 602, first NPU 603, and second NPU 604. Memory 605 stores NN data 400.

As described above, inference processing unit 110 is configured to obtain an input image, output a feature value and delay label information when the input image is input into common NN 121, determine a forward propagation computation method (optimum parallel computation processing, delay coping parallel computation processing, etc.) for processing specialized NN group 124 on the basis of the delay label information, and input the feature value into specialized NN group 124 to process specialized NN group 124 by the determined forward propagation computation method. For example, inference processing unit 110 includes: obtainer 150 that obtains an input image; common NN 121 that receives the input of the input image and outputs a feature value and delay label information; NN inference computation management unit 130 (an example of a determiner) that determines a forward propagation computation method (optimum parallel computation processing, delay coping computation processing, etc.) for processing specialized NN group 124 on the basis of the delay label information; and NN inference computation management unit 130 (an example of a controller) that inputs a feature value into specialized NN group 124 to process the determined forward propagation computation processing.

Next, training apparatus 300 will be described. Training apparatus 300 generates NN data 400 to be used for inference processing by NN inference unit 120 of device 100. Training apparatus 300 includes multi-task trainer 301, delay flag information measurer 302, delay flag correct answer label generator 303, delay flag trainer 304, training label database 305 (training label DB 305), and scene image database 306 (scene image DB 306).

multi-task trainer 301 trains feature classifier 122 and specialized NN group 124 of NN data 400. In the present embodiment, multi-task trainer 301 performs training for object detection and skeleton detection.

multi-task trainer 301 performs training processing in which multi-task learning is applied to the training of NNs. Although the details will be described later, multi-task trainer 301 receives a scene image obtained from scene image DB 306 as an input, uses a correct answer label in skeleton detection corresponding to the scene image and a correct answer label in object detection corresponding to the scene image obtained from training label DB 305 as reference data (teacher data), and generates NNs (common NN 121 and specialized NN group 124) on the basis of backpropagation (BP) or the like.

Note that the multi-task learning is a method of machine learning that solves a plurality of tasks with a single model. This is a method aiming to improve the accuracy in task prediction by training a plurality of related tasks simultaneously to obtain a "common factor" among the tasks. In the image recognition field, a plurality of tasks, such as object classification, object detection, and object area (segmentation) recognition, may be trained simultaneously. In the present embodiment, the plurality of tasks are skeleton detection and object detection.

Research has been conducted to apply multi-task learning to training processing of NN data, and multi-task trainer 301 trains an NN commonly used for each task (for example, common NN 121) and an NN specialized for each task (for example, specialized NN group 124), for example. There is also an advantage that the use of the commonly used NN can compress the total calculation amount and memory usage amount of the inference processing necessary for each task processing.

Delay flag information measurer 302 and delay flag correct answer label generator 303 perform processing for generating training data that is used when delay flag classifier 123 is trained by delay flag trainer 304.

Delay flag information measurer 302 measures the processing time for the forward propagation computation of common NN 121 and specialized NN group 124 generated by multi-task trainer 301. In the present embodiment, delay flag information measurer 302 measures at least the processing time of first task NN 125. This is because first task NN 125 includes the NMS processing, and the processing time differs depending on the number of candidate detection areas in the input image. Second task NN 126 does not include processing for which the processing time differs depending on the number of candidate detection areas, such as the NMS processing, that is, the processing time does not change greatly in accordance with the input image, so that the processing time is not measured in the present embodiment.

Delay flag correct answer label generator 303 generates a delay flag correct answer label to be used for the training of common NN 121 in delay flag trainer 304 by using information based on the measurement result of the processing time.

Delay flag trainer 304 performs processing of training common NN 121, out of common NN 121 and specialized NN group 124 generated by multi-task trainer 301, by using the delay flag correct answer label generated by delay flag correct answer label generator 303. Delay flag trainer 304 updates weight data and bias data in delay flag classifier 123 of common NN 121 on the basis of backpropagation, using the scene image as input data and a delay flag correct answer label as reference data (teacher data), for example. That is, delay flag trainer 304 trains delay flag classifier 123 of common NN 121 by using the scene image and the delay flag correct answer label. Note that delay flag trainer 304 may train feature classifier 122 together with delay flag classifier 123 by using, for example, the delay flag correct answer label.

Training label DB 305 stores a training label for generating NN data 400. Training label DB 305 stores, for example, a training label for skeleton detection and a training label for object detection with respect to one scene image.

Scene image DB 306 stores a scene image for generating NN data 400.

Training label DB 305 and scene image DB 306 are achieved by, for example, a semiconductor memory or the like but are not limited thereto.

As described above, training apparatus 300 is configured to obtain a scene image, input the scene image into common NN 121 to obtain a feature value, input the feature value into specialized NN group 124 to process specialized NN group 124, measure the time from the inputting of the scene image into common NN 121 until the end of the processing of specialized NN group 124, and train common NN 121 by machine learning using the scene image as input data, the information on the processing time of specialized NN group 124 as output data, and the measured time as reference data. For example, training apparatus 300 includes: delay flag information measurer 302 that obtains a scene image, inputs the scene image into common NN 121 to obtain a feature value, inputs the feature value into specialized NN group 124 to process specialized NN group 124, and measures the time from the inputting of the scene image into common NN 121 until the end of the processing of specialized NN group 124; and delay flag trainer 304 that trains common NN 121 by machine learning using the scene image as input data, the information on the processing time of specialized NN group 124 as output data, and the measured time as reference data.

[2. Operation of Information Processing System]

Subsequently, the operation of information processing system 10 will be described with reference to FIGS. 5 to 13.

[2-1. Operation of Device]

Figure 5:
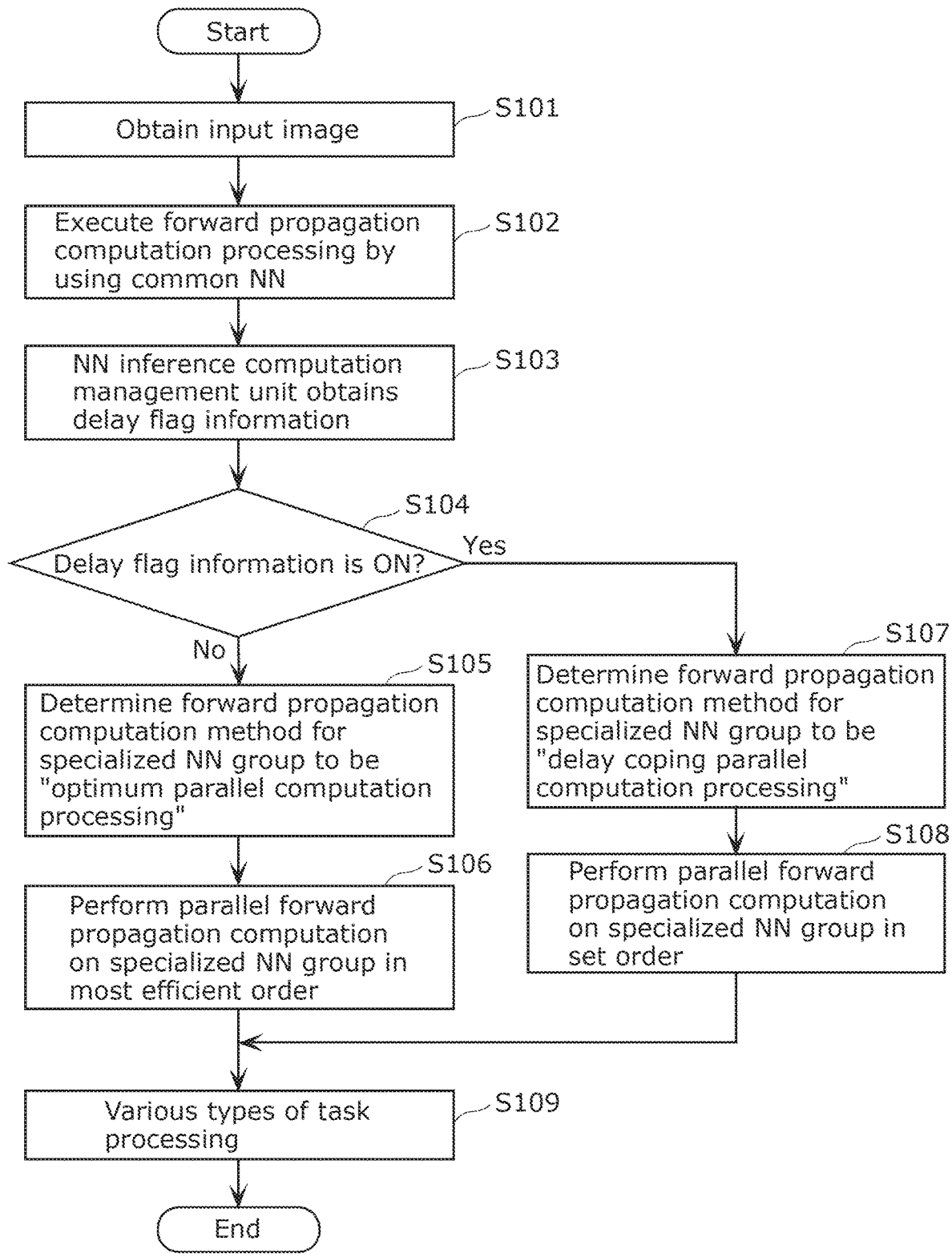
FIG. 5 is a flowchart showing an operation of a device according to the embodiment.

First, the processing in device 100 will be described with reference to FIGS. 5 to 6C. FIG. 5 is a flowchart showing the operation of device 100 according to the present embodiment. For convenience, FIG. 5 describes an example in which the delay flag information included in table 500 is of two types of "ON (ON1)" and "OFF". In other words, it is assumed that delay flag classifier 123 has been trained to output either "ON" or "OFF".

As shown in FIG. 5, obtainer 150 of device 100 obtains an input image from camera 200 (S101). Obtainer 150 outputs the input image obtained in step S101 to NN inference unit 120.

Next, when receiving the input of the input image from obtainer 150, NN inference unit 120 first executes forward propagation computation processing by using common NN 121 (S102). Specifically, NN inference unit 120 inputs an input image into feature classifier 122 of common NN 121 to obtain a feature value that is an output of feature classifier 122. Then, NN inference unit 120 inputs the obtained feature value into delay flag classifier 123 to obtain delay flag information that is an output of delay flag classifier 123. The delay flag information is a result inferred from the feature value by delay flag classifier 123, and in the present embodiment, the delay flag information indicates an inference result as to whether or not the inference processing time of entire NN inference unit 120 has exceeded a threshold.

NN inference unit 120 outputs the obtained delay flag information to NN inference computation management unit 130. Note that NN inference unit 120 may further output the delay flag information to a functional unit provided in device 100 and external to inference processing unit 110. The functional unit may be, for example, a functional unit having a graphic function.

Next, NN inference computation management unit 130 obtains delay flag information (S103). NN inference computation management unit 130 determines whether or not the obtained delay flag information is "ON" (S104). In a case where the delay flag information is "OFF", that is, in a case where the delay flag information is an inference result indicating that the service can be completed within the processing time required for device 100 even when the inference processing is performed in accordance with the "optimum parallel computation processing" (No in S104), NN inference computation management unit 130 determines the "optimum parallel computation processing to be a forward propagation computation method for specialized NN group 124" on the basis of table 500 shown in FIG. 3 (S105). That is, when the delay flag information is "OFF", NN inference computation management unit 130 determines to execute the processing of specialized NN group 124 in the order based on the "optimum parallel computation processing". The order based on the "optimum parallel computation processing" is an example of a first schedule. NN inference computation management unit 130 outputs the determined forward propagation computation method for specialized NN group 124 to NN inference unit 120.

When NN inference unit 120 obtains from NN inference computation management unit 130 that the forward propagation computation method for specialized NN group 124 is the "optimum parallel computation processing", NN inference unit 120 executes parallel forward propagation computation processing in the order indicated by the "optimum parallel computation processing". For example, NN inference unit 120 performs parallel forward propagation computation on specialized NN group 124 in the most efficient order (S106). NN inference unit 120 inputs the feature value that is an output of feature classifier 122 to each NN of specialized NN group 124, performs inference processing according to the schedule based on the "optimum parallel computation processing", and obtains an inference result (skeleton detection result, object detection result, etc.) that is an output of each NN.

Figure 6A:
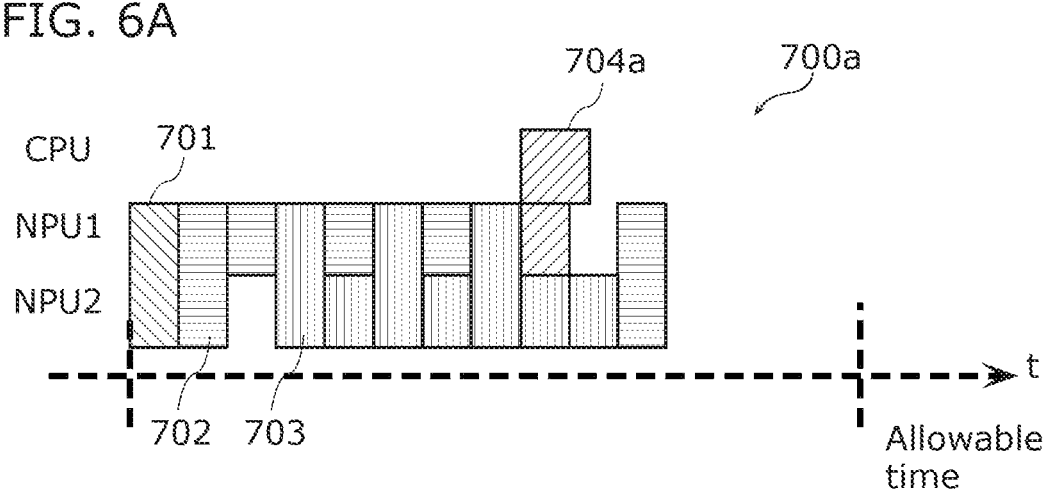
FIG. 6A is a schematic diagram showing an example of a processing time of a common NN and a specialized NN group and units in charge of computation thereof according to the embodiment.

FIG. 6A is a schematic diagram showing an example of the processing time of common NN 121 and specialized NN group 124 and units in charge of computation thereof according to the present embodiment. Specifically, first information 700a in FIG. 6A shows an example of the processing time and the units in charge of computation in a case where the processing ends within the allowable time even when the processing is performed in the computation order based on the "optimum parallel computation processing". Note that FIGS. 6A to 6C describe examples in which the NMS processing has been outsourced to CPU 602.

Area 701 indicates the occupancy rate of each unit (CPU 602, first NPU 603, and second NPU 604) in common NN 121. In area 701, first NPU 603 (NPU 1 in FIGS. 6A to 6C) and second NPU 604 (NPU 2 in FIGS. 6A-6C) perform processing by using common NN 121. Area 702 indicates the occupancy rate of each unit in first task NN 125. In area 702, at least one of first NPU 603 and second NPU 604 performs object detection processing by using first task NN 125.

Area 703 indicates the occupancy rate of each unit in second task NN 126. In area 703, at least one of first NPU 603 and second NPU 604 performs skeleton detection processing by using second task NN 126. Areas 704a and 704b indicate the occupancy rate of each unit in the NMS processing of first task NN 125. In areas 704a and 704b, CPU 602 performs the NMS processing.

As shown in FIG. 6A, when "No" in step S104, NN inference computation management unit 130 instructs NN inference unit 120 to perform forward propagation computation on specialized NN group 124 by the "optimum parallel computation processing" indicating that the computation processing is performed by the parallel computation method in which the number of memory accesses, the computation time, and the like are balanced. In this case, even when the processing is performed in the computation order based on the "optimum parallel computation processing", the processing can be ended within the allowable time.

Referring again to FIG. 5, in a case where the delay flag information is "ON", that is, in a case where the delay flag information is an inference result indicating that the service cannot be completed within the processing time required for device 100 when the inference processing is performed in accordance with the "optimum parallel computation processing" (Yes in S104), NN inference computation management unit 130 determines the "delay coping parallel computation processing" to be the forward propagation computation method for specialized NN group 124 on the basis of table 500 shown in FIG. 3 (S107). That is, when the delay flag information is "ON", NN inference computation management unit 130 determines to execute the processing of specialized NN group 124 in the order based on the "delay coping parallel computation processing". The order based on the "delay coping parallel computation processing" is an example of a second schedule. NN inference computation management unit 130 outputs the determined forward propagation computation method for specialized NN group 124 to NN inference unit 120.

When NN inference unit 120 obtains from NN inference computation management unit 130 that the forward propagation computation method for specialized NN group 124 is the "delay coping parallel computation processing", NN inference unit 120 executes parallel forward propagation computation processing in the order indicated by the "delay coping parallel computation processing". For example, NN inference unit 120 performs parallel forward propagation computation on specialized NN group 124 in the set order (S108). NN inference unit 120 inputs the feature value that is an output of feature classifier 122 into each NN of specialized NN group 124, performs inference processing according to the schedule based on the "delay coping parallel computation processing", and obtains an inference result (skeleton detection result, object detection result, etc.) that is an output of each NN.

Figure 6B:
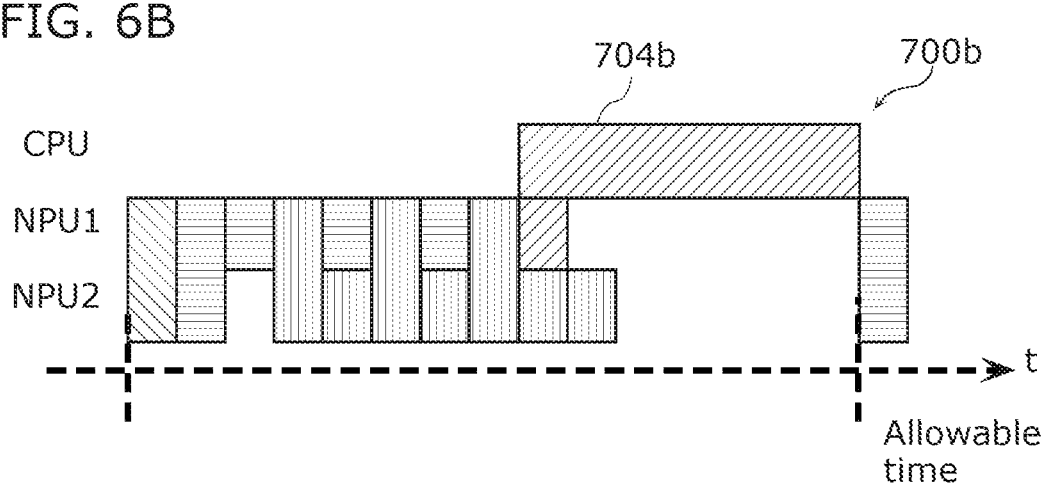
FIG. 6B is a schematic diagram showing another example of the processing time of the common NN and the specialized NN group and the units in charge of computation thereof according to the embodiment.

FIG. 6B is a schematic diagram showing an example of the processing time of common NN 121 and specialized NN group 124 and the units in charge of computation thereof according to the present embodiment. Specifically, second information 700*b* in FIG. 6B shows an example of the processing time and the units in charge of computation in a case where the processing does not end within the allowable time when the processing is performed in the computation order based on the "optimum parallel computation processing". FIG. 6B shows a case where the allowable time is exceeded when the optimum parallel computation processing is performed, that is, a case where the determination is Yes in step S104.

As shown in FIG. 6B, for example, the time required for the NMS processing (area 704*b*) is longer than the time (area 704*a*) in FIG. 6A, and hence the inference time of inference processing unit 110 has exceeded the allowable time. Depending on the input image, the time required for the NMS processing may be long, as shown in FIG. 6B.

Therefore, as shown in step S107 in FIG. 5, NN inference computation management unit 130 determines to perform the inference processing in accordance with the "delay coping parallel computation processing" instead of the "optimum parallel computation processing" because the allowable time may be exceeded when the inference processing is performed in accordance with the "optimum parallel computation processing". In the present embodiment, the "delay coping parallel computation processing" indicates that the computation order is rearranged so that the NMS processing (processing performed in area 704*b*) can be started with priority. In the following, that the allowable time is exceeded is also referred to as that a delay occurs.

Figure 6C:
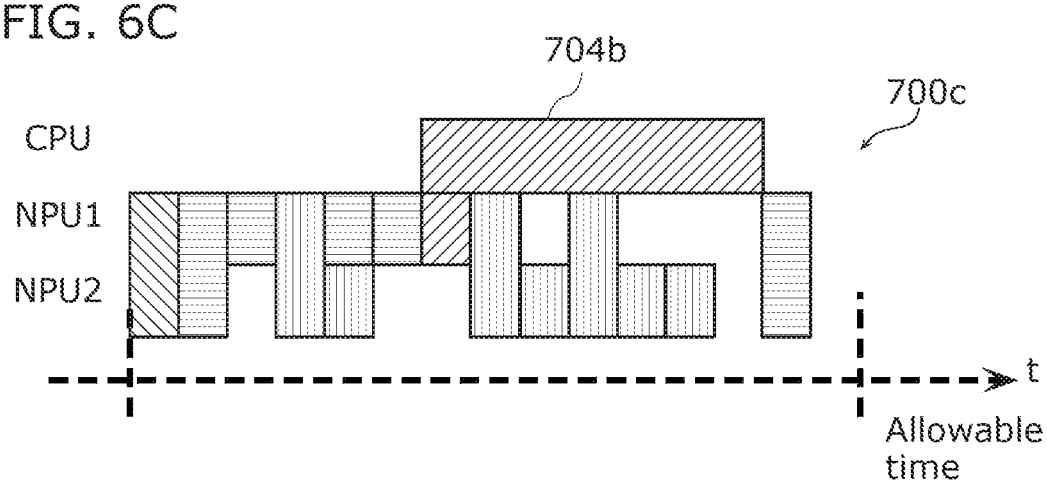
FIG. 6C is a schematic diagram showing an example of the processing time of the common NN and the specialized NN group and the units in charge of computation thereof after recombination of a computation order according to the embodiment.

FIG. 6C is a schematic diagram showing an example of the processing time of common NN 121 and specialized NN group 124 and the units in charge of computation thereof after the recombination of the computation order according to the present embodiment. Third information 700*c* in FIG. 6C shows an example of the processing time and the units in charge of computation thereof when the processing is performed in the computation order based on the "delay coping parallel computation processing" in a case where the processing does not end within the allowable time in the computation order based on the "optimum parallel computation processing". Third information 700*c* is obtained by changing the processing order from second information 700*b* shown in FIG. 6B. FIG. 6C shows the processing order and the like after the determination is Yes in step S104 and the change is made.

As shown in FIG. 6C, in the computation order based on the "delay coping parallel computation processing", the NMS processing is started with priority. In the computation order, the timing of starting the NMS processing is accelerated from the computation order based on the "optimum parallel computation processing" so as to accelerate the timing of starting the NMS processing. Thus, even when the time required for the NMS processing is long, the inference time of inference processing unit 110 can be prevented from exceeding the allowable time. The computation order (processing order) is an example of a task schedule. The task schedule may also include an order in which the NN models of specialized NN group 124 perform memory loading.

As shown in FIGS. 6B and 6C, in the "optimum parallel computation processing" and the "delay coping parallel computation processing", the processing timing of the NMS processing is changed, but a change in the content of the processing, the deletion of the processing, or the like is not performed. For this reason, the accuracy of the inference result is substantially the same when the inference processing is performed in accordance with the "optimum parallel computation processing" and when the inference processing is performed in accordance with the "delay coping parallel computation processing".

In the present embodiment, as shown in FIGS. 6B and 6C, an example is shown where a layer in which the processing time varies greatly depending on the input image is a layer for performing the NMS processing, but a layer using another algorithm in which the processing time varies greatly depending on the input image may be used.

NN inference unit 120 outputs the inference result, output by the computation in step S106 or S108, to task executor 140.

Referring again to FIG. 5, task executor 140 operates based on the inference result obtained from NN inference unit 120, and the service is provided to a user. That is, task executor 140 executes various types of task processing (S109).

As described above, for providing the inference service within the allowable time, device 100 can operate while ensuring a certain service capacity by having inference processing unit 110 capable of determining the load of the inference processing at an early stage and changing the computation order. When the delay flag information is "OFF", inference processing unit 110 can provide the inference service by the optimum parallel computation and can contribute to power saving.

Further, inference processing unit 110 estimates the processing time required for the NN inference processing in the plurality of subsequent NNs at an initial stage (preprocessing) from the feature value of the input image. Then, in parallel computation, inference processing unit 110 can perform the NN inference processing in a computation order in which the processing can be completed within the required processing time.

In the above description, an example has been described where the computation processing is executed in the order shown in FIG. 6C when the delay flag information is "ON", but the present disclosure is not limited thereto, and the order of the computation processing may be changed in accordance with the delay flag information. For example, when the delay flag information includes information indicating the degree of delay (for example, the degree of delay:

"large", "medium", and "small", an estimated value of the delay time, etc.), a parallel computation item may be set for each degree of delay. That is, the order of computation processing may be set for each degree of delay. Then, in step S107, NN inference computation management unit 130 may determine the parallel computation item corresponding to the degree of delay included in the delay flag information to be the forward propagation computation method for specialized NN group 124.

[2-2. Operation of Training Apparatus]

Figure 7:
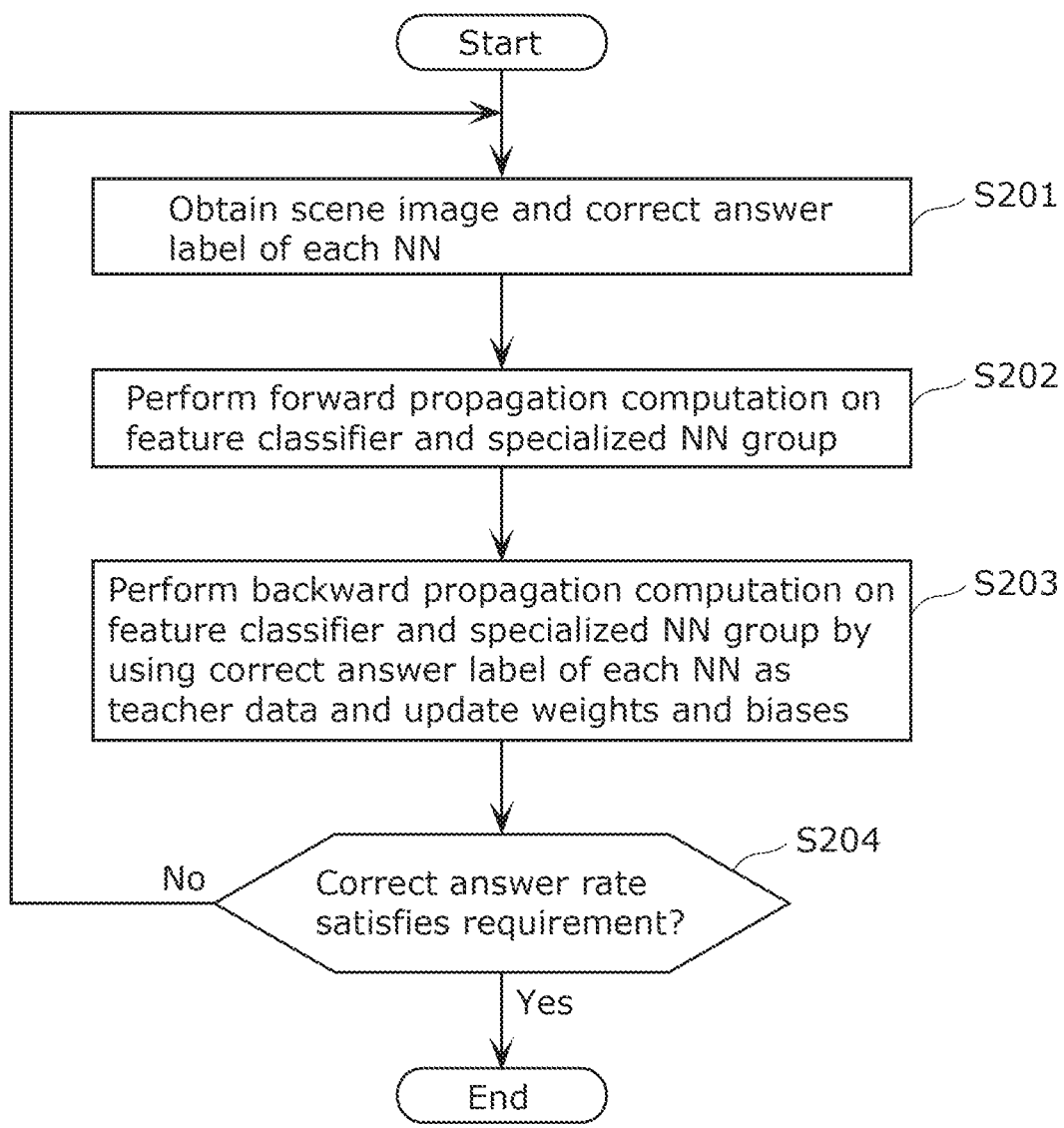
FIG. 7 is a flowchart showing an operation of a multi-task trainer according to the embodiment.
Figure 8:
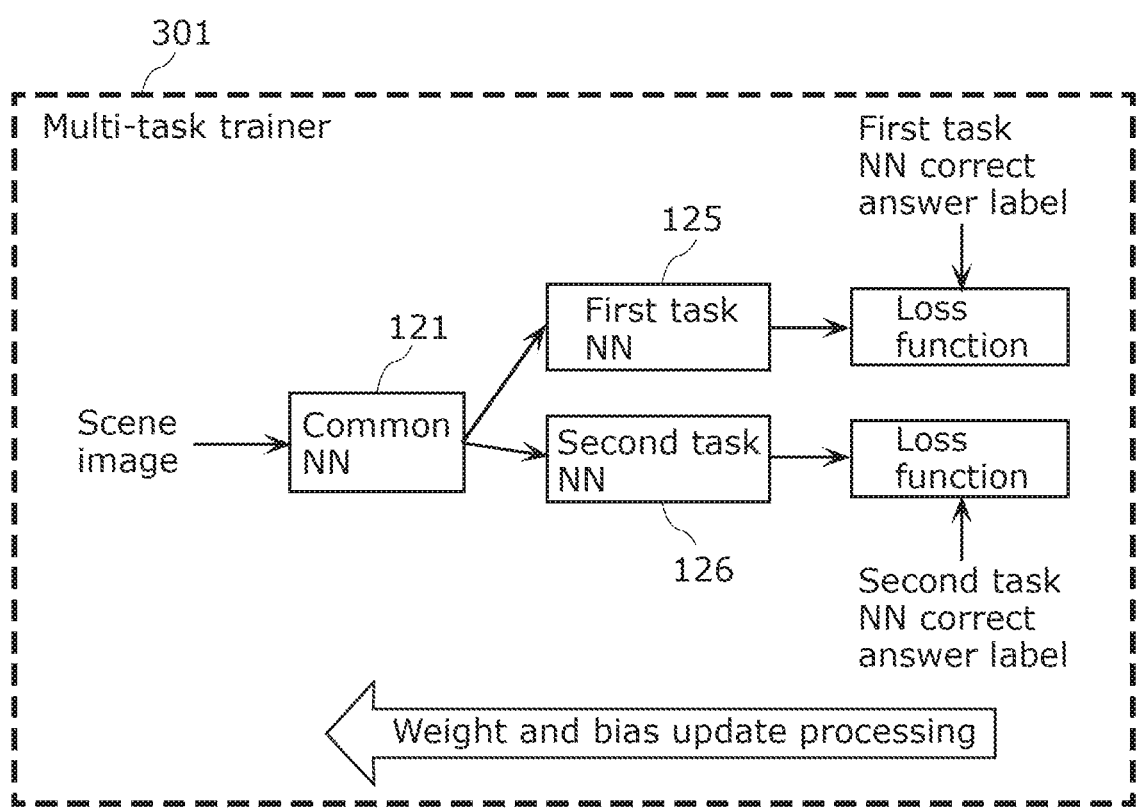
FIG. 8 is a diagram schematically showing the operation of the multi-task trainer according to the embodiment.

Subsequently, the operation of training apparatus 300 will be described with reference to FIGS. 7 to 13. First, the operation of multi-task trainer 301 will be described with reference to FIGS. 7 and 8. FIG. 7 is a flowchart showing the operation of multi-task trainer 301 according to the present embodiment. FIG. 8 is a diagram schematically showing the operation of multi-task trainer 301 according to the present embodiment.

As shown in FIG. 7, multi-task trainer 301 obtains a scene image from scene image DB 306 and obtains a correct answer label for each NN from training label DB 305 (S201). multi-task trainer 301 obtains a scene image, a correct answer label for first task NN 125 (first task NN correct answer label) corresponding to the scene image, and a correct answer label for second task NN 126 (second task NN correct answer label) corresponding to the scene image. In the present embodiment, multi-task trainer 301 obtains a correct answer label for the object detecting NN and a correct answer label for the skeleton detecting NN.

Next, multi-task trainer 301 performs forward propagation computation by using common NN 121 and specialized NN group 124. For example, multi-task trainer 301 performs forward propagation computation by using feature classifier 122 of common NN 121 and specialized NN group 124 (S202).

As shown in FIG. 8, multi-task trainer 301 obtains a feature value that is an output of common NN 121 obtained by inputting the scene image into common NN 121, and further obtains a first inference result that is an output of first task NN 125 obtained by inputting the obtained feature value into first task NN 125, and a second inference result that is an output of second task NN 126 obtained by inputting the feature value into second task NN 126.

Referring again to FIG. 7, next, multi-task trainer 301 performs backward propagation computation on feature classifier 122 and specialized NN group 124, using the correct answer label for each NN as reference data (teacher data), and updates weights and biases (S203). On the basis of backpropagation, multi-task trainer 301 regards an output value of a loss function as an error and executes update processing on the weights (weight data) and biases (bias data) in feature classifier 122 of common NN 121 and specialized NN group 124 by backward propagation computation.

As shown in FIG. 8, a loss function in first task NN 125 represents how much is the error of the first inference result of first task NN 125 with respect to the first task NN correct answer label. A loss function in second task NN 126 represents how much is the error of the second inference result of second task NN 126 with respect to the second task NN correct answer label.

multi-task trainer 301 obtains a first inference result that is an output of first task NN 125 on the basis of the scene image and obtains an output value of the loss function on the basis of the first inference result and the first task NN correct answer label. Then, multi-task trainer 301 regards the output value as an error and executes update processing on the weights and biases in feature classifier 122 of common NN 121 and first task NN 125 of specialized NN group 124 by backward propagation computation.

Next, multi-task trainer 301 obtains a second inference result that is an output of second task NN 126 on the basis of the scene image and obtains an output value of the loss function on the basis of the second inference result and the second task NN correct answer label. Then, multi-task trainer 301 regards the output value as an error and executes update processing on the weights and biases in feature classifier 122 of common NN 121 and second task NN 126 of specialized NN group 124 by backward propagation computation. As described above, multi-task trainer 301 alternately executes the update processing, for example.

Referring again to FIG. 7, multi-task trainer 301 determines whether or not the correct answer rate of the NN inference result (or the error rate obtained by comparing the correct answer label with the scene image) satisfies a requirement (S204). The requirement may be, for example, a correct answer rate required for device 100. That is, multi-task trainer 301 may perform the determination in step S204 based on whether or not the correct answer rate of the NN inference result is higher than or equal to the correct answer rate required for device 100.

When the correct answer rate of the NN inference result satisfies the requirement (Yes in S204), multi-task trainer 301 ends the processing. When the correct answer rate of the NN inference result does not satisfy the requirement (No in step S204), multi-task trainer 301 returns to step S201 and continues the processing. That is, when the correct answer rate of the NN inference result does not satisfy the requirement, multi-task trainer 301 performs training by using various scene images and correct answer labels associated with the scene images and continues the training processing until the correct answer rate of the NN inference result satisfies the requirement.

Figure 9:
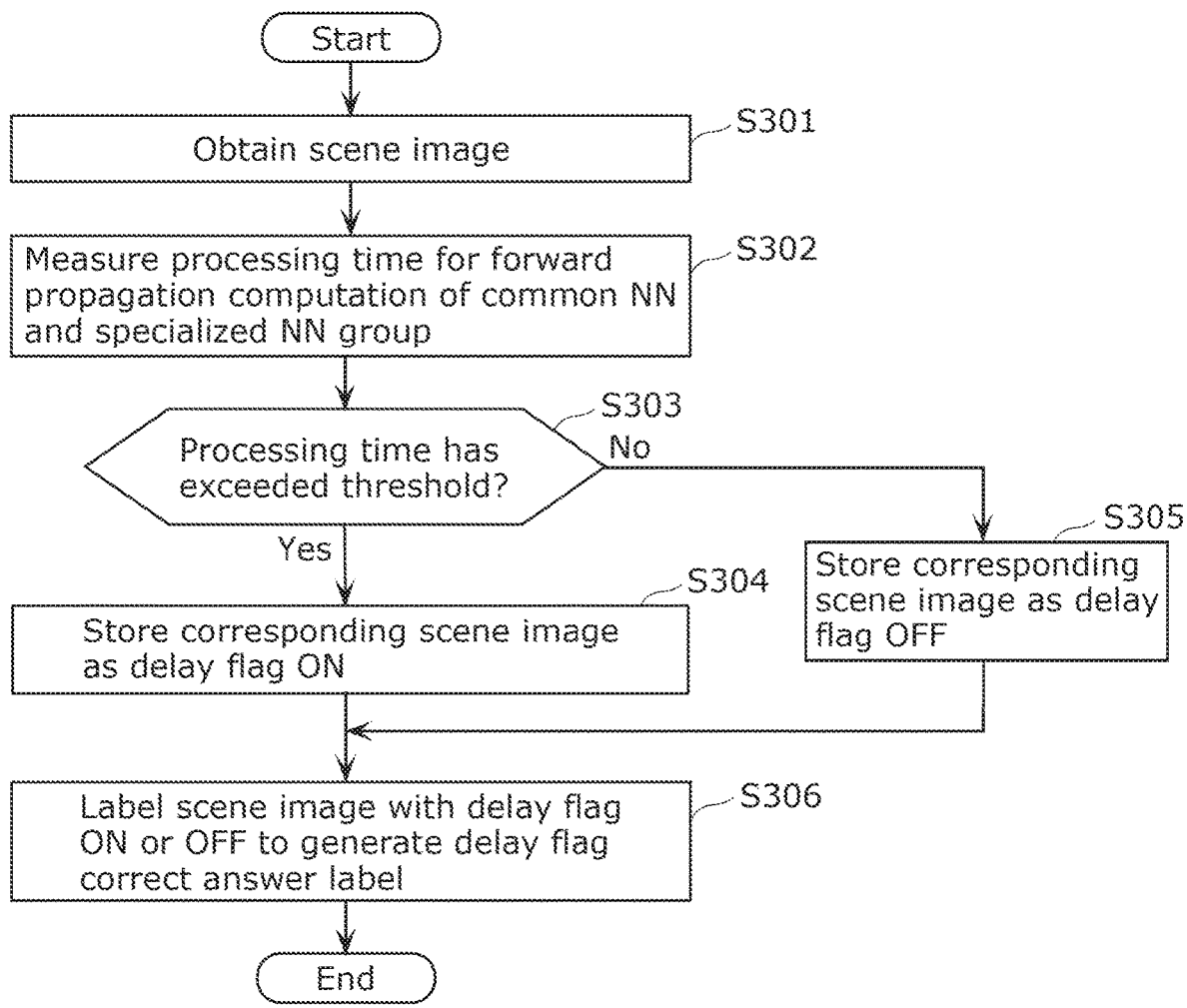
FIG. 9 is a flowchart showing operations of a delay flag information measurer and a delay flag correct answer label generator according to the embodiment.
Figure 10:
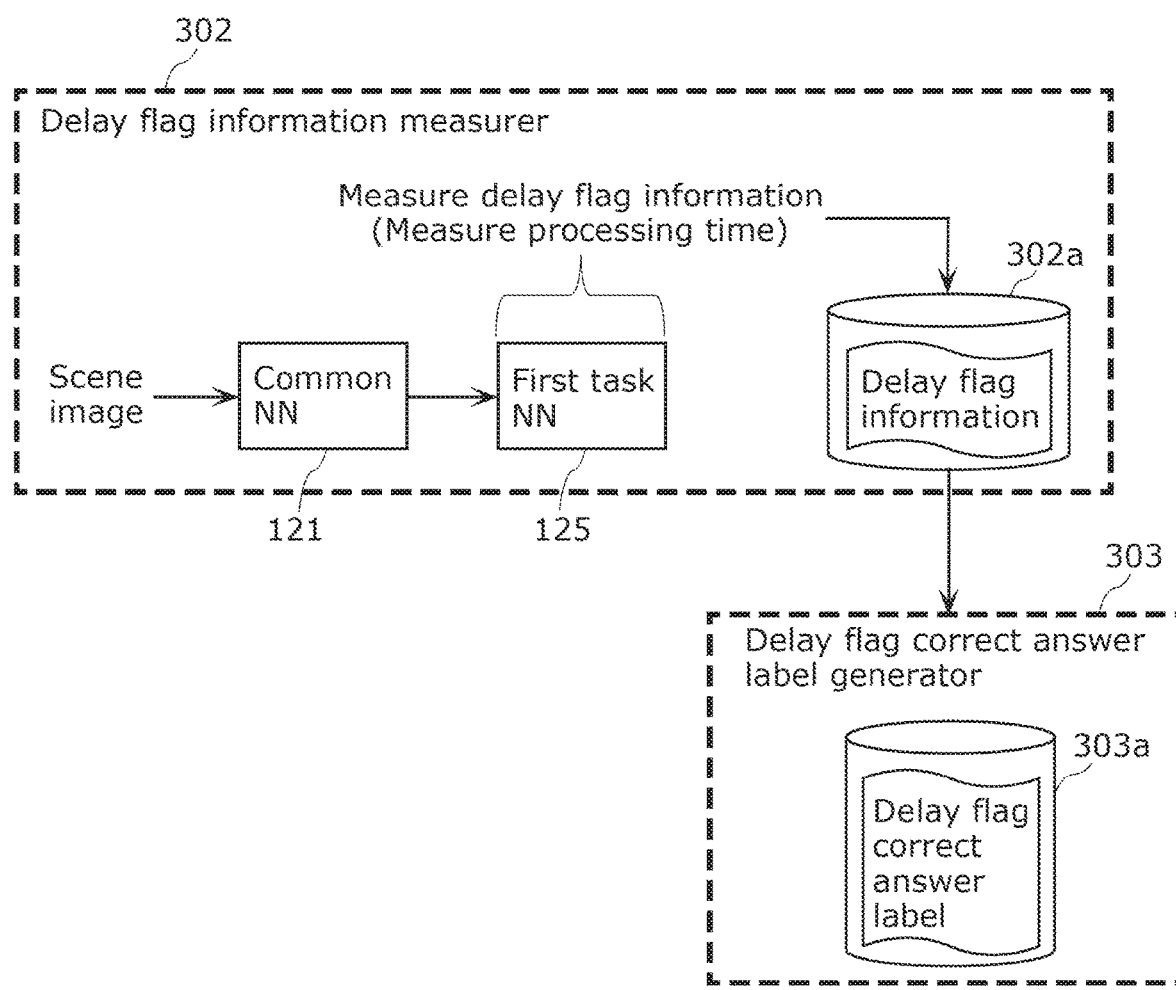
FIG. 10 is a diagram schematically showing the operations of the delay flag information measurer and the delay flag correct answer label generator according to the embodiment.

Subsequently, the operations of delay flag information measurer 302 and delay flag correct answer label generator 303 will be described with reference to FIGS. 9 and 10. FIG. 9 is a flowchart showing the operation of delay flag information measurer 302 and delay flag correct answer label generator 303 according to the present embodiment. FIG. 10 is a diagram schematically showing the operations of delay flag information measurer 302 and delay flag correct answer label generator 303 according to the present embodiment.

As shown in FIG. 9, delay flag information measurer 302 obtains an arbitrary scene image (S301). Delay flag information measurer 302 may obtain, for example, a scene image used for multi-task learning by multi-task trainer 301.

Next, delay flag information measurer 302 measures the computation time for the forward propagation computation of common NN 121 and specialized NN group 124 trained by multi-task trainer 301 (S302). In the present embodiment, delay flag information measurer 302 measures the computation time of first task NN 125 including the NMS processing.

In step S302, delay flag information measurer 302 inputs the scene image into common NN 121 to obtain a feature value and delay flag information, further inputs the feature value into first task NN 125 to process first task NN 125, and measures the time from the inputting of the scene image into common NN 121 until the end of the processing of specialized NN group 124. In step S302, delay flag information measurer 302 may measure at least the time from the inputting of the feature value into first task NN 125 until the end of the processing of specialized NN group 124. FIG. 10 shows an example in which delay flag information measurer 302 measures the time (an example of the inference time) from the inputting of the feature value into first task NN 125 until the end of the processing of specialized NN group 124.

In the measurement of the processing time, the same hardware device as device 100 may be used. The processing time may be calculated by simulation.

As shown in FIG. 10, delay flag information measurer 302 obtains a feature value obtained by inputting the scene image into common NN 121 and information on the processing time for the plurality of tasks subsequent to the processing of common NN 121 (delay flag information that is an output from delay flag classifier 123), and measures the processing time of first task NN 125 when the feature value is input. Measuring the processing time is an example of measuring the delay flag information.

Referring again to FIG. 9, delay flag information measurer 302 determines whether or not the measured processing time has exceeded the threshold (S303). The threshold is set in advance, for example. When the processing time has exceeded the threshold (Yes in S303), delay flag information measurer 302 stores the corresponding scene image as a delay flag ON into delay flag information DB 302a (see FIG. 10) (S304). When the processing time has not exceeded the threshold (No in S303), delay flag information measurer 302 stores the corresponding scene image into delay flag information DB 302a as a delay flag OFF (S305).

When the processing time is being measured in each of first task NN 125 and second task NN 126, it is possible that: (i) a delay occurs only in first task NN 125 (the allowable time is exceeded); and (ii) a delay occurs only in second task NN 126. In this case, the content of the "parallel computation item" (for example, the computation order after recombination) may be different between (I) and (ii). As described above, when the content of the "parallel computation item" is different, a plurality of types of the delay flag "ON" may exist for the respective contents of the "parallel computation item".

Next, delay flag correct answer label generator 303 generates a delay flag correct answer label on the basis of the delay flag information of delay flag information DB 302a. Delay flag correct answer label generator 303 labels the scene image with the delay flag "ON" or "OFF" to generate a delay flag correct answer label (S306). It can also be said that delay flag correct answer label generator 303 generates a delay flag correct answer label by associating the delay flag information with the scene image. Delay flag correct answer label generator 303 stores the generated delay flag correct answer label into delay flag correct answer label DB 303a (see FIG. 10).

Figure 11:
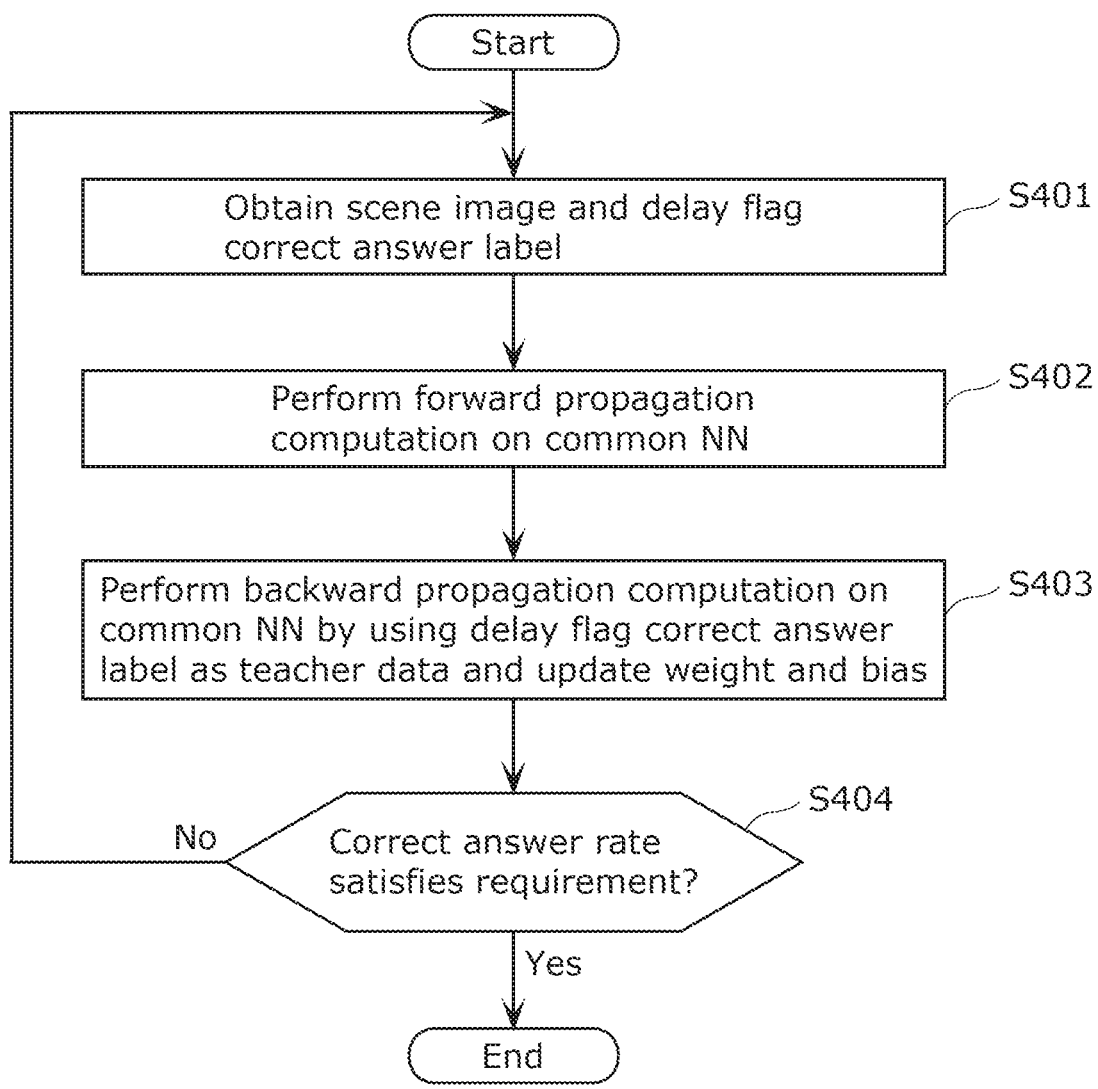
FIG. 11 is a flowchart showing an operation of a delay flag trainer according to the embodiment.
Figure 12:
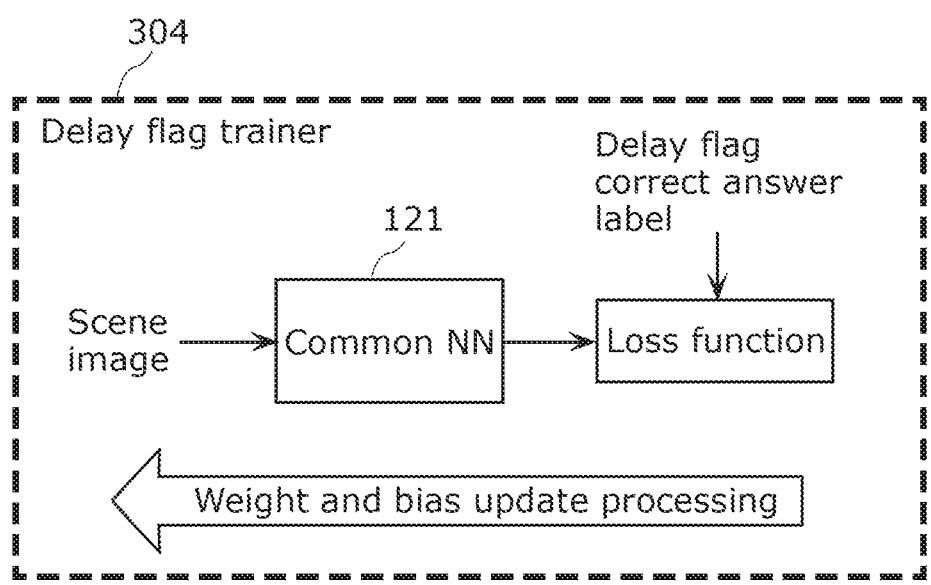
FIG. 12 is a diagram schematically showing the operation of the delay flag trainer according to the embodiment.

Subsequently, the operation of delay flag trainer 304 will be described with reference to FIGS. 11 and 12. FIG. 11 is a flowchart showing the operation of delay flag trainer 304 according to the present embodiment. FIG. 12 is a diagram schematically showing the operation of delay flag trainer 304 according to the present embodiment.

As shown in FIG. 11, delay flag trainer 304 obtains a scene image from scene image DB 306 and obtains a delay flag correct answer label corresponding to the scene image from delay flag correct answer label DB 303a (S401).

Next, delay flag trainer 304 performs forward propagation computation by using common NN 121 (S402). Delay flag trainer 304 performs forward propagation computation by using, for example, delay flag classifier 123 of common NN 121.

As shown in FIG. 12, delay flag trainer 304 obtains a feature value that is an output of feature classifier 122 obtained by inputting a scene image into feature classifier 122 of common NN 121 and further obtains delay flag information that is an output of delay flag classifier 123 obtained by inputting the obtained feature value into delay flag classifier 123.

Referring again to FIG. 11, next, delay flag trainer 304 performs backward propagation computation on common NN 121, using the delay flag correct answer label as reference data (teacher data), and updates the weight and bias (S403). On the basis of backpropagation, delay flag trainer 304 regards the output value of the loss function as an error and executes update processing on the weight (weight data) and the bias (bias data) in delay flag classifier 123 of common NN 121 by backward propagation computation.

As shown in FIG. 12, the loss function in common NN 121 represents how much is the error of the inference result (delay flag information) of delay flag classifier 123 of common NN 121 with respect to the delay flag correct answer label corresponding to the scene image.

Delay flag trainer 304 obtains delay flag information that is an output of delay flag classifier 123 on the basis of the scene image, and obtains an output value of the loss function on the basis of the delay flag information and the delay flag correct answer label. Then, delay flag trainer 304 regards the output value as an error and executes update processing on the weight and bias in delay flag classifier 123 of common NN 121 by backward propagation computation.

As described above, in steps S402 and S403, common NN 121 (for example, delay flag classifier 123) is trained by machine learning, using the scene image as input data, the delay flag information output from delay flag classifier 123 of common NN 121 as output data, and the time measured by delay flag information measurer 302 as reference data.

Note that delay flag trainer 304 may regard the output value as an error and executes update processing on the weights and biases in feature classifier 122 and delay flag classifier 123 by backward propagation computation. That is, delay flag trainer 304 may target feature classifier 122 for the training processing in addition to delay flag classifier 123. Thus, the weight and bias are updated in feature classifier 122 together with those in delay flag classifier 123, so that it is expected that the accuracy of the delay flag information output by delay flag classifier 123 is improved.

Referring again to FIG. 11, delay flag trainer 304 determines whether or not the correct answer rate of the NN inference result (or the error rate obtained by comparing the inference result with the delay flag correct answer label) satisfies a requirement (S404). The requirement may be, for example, a correct answer rate required for device 100. That is, delay flag trainer 304 may perform the determination in step S404 based on whether or not the correct answer rate of the NN inference result is higher than or equal to the correct answer rate required for device 100.

When the correct answer rate of the NN inference result satisfies the requirement (Yes in S404), delay flag trainer 304 ends the processing. When the correct answer rate of the NN inference result does not satisfy the requirement (No in S404), delay flag trainer 304 returns to step S401 and continues the processing. That is, when the correct answer rate of the NN inference result does not satisfy the requirement, delay flag trainer 304 performs training by using various scene images and correct answer labels with the scene images and continues the training processing until the correct answer rate of the NN inference result satisfies the requirement.

After the completion of the training processing by delay flag trainer 304, NN data 400 becomes able to execute the operation of device 100 described above. The generated NN data 400 is transmitted to device 100.

Although training apparatus 300 according to the present embodiment performs the training processing sequentially, training apparatus 300 may perform multi-task learning on feature classifier 122 of common NN 121 and specialized NN group 124 and on delay flag classifier 123 of common NN 121, and measure the processing time for the forward propagation computation of specialized NN group 124 at that time, to obtain delay flag information. At the time of backward propagation computation, training apparatus 300 may use error information with the delay flag information (delay flag correct answer label) as a correct answer to update the weight and bias of delay flag classifier 123 of common NN 121, and may use error information of multi-task learning to update the weights and biases of feature classifier 122 of common NN 121 and specialized NN group 124. As described above, training apparatus 300 may be configured to be able to perform multi-task learning on feature classifier 122 of common NN 121 and specialized NN group 124 and on delay flag classifier 123 of common NN 121.

Here, the output of the training result evaluation of training apparatus 300 according to the present embodiment will be described with reference to FIG. 13. FIG. 13 is a table showing the occurrence rate of the delay flag information according to the present embodiment.

As an example of the output of the training result evaluation of training apparatus 300 according to the present embodiment, a configuration may be considered in which the "occurrence rate of delay flag information" shown in FIG. 13 is output in addition to inference quality information such as the mean average precision (mAP) of specialized NN group 124. The result shown in FIG. 13 may motivate a developer to change configurations of NNs, hyperparameters, or the like in order to increase the occurrence rate of the delay flag information "OFF". In addition, by displaying the occurrence rate of the inference delay not satisfying the required specification (the occurrence rate corresponding to the delay flag information "NG" in FIG. 13) or the information of the corresponding scene image, training apparatus 300 can encourage the developer or the like to consider measures to prevent the occurrence of the inference delay at the process stage of the NN training processing.

Other Embodiments

Although the present disclosure has been described above on the basis of the embodiment, the present disclosure is not limited to the above embodiment.

For example, in the above embodiment, an example has been described where a feature value as an output of feature classifier 122 is input into delay flag classifier 123 as input data, but the input data is not limited thereto. The input data may be, for example, an input image from camera 200. For example, NN inference unit 120 may input an input image from camera 200 into delay flag classifier 123 to obtain delay flag information that is an output of delay flag classifier 123. In this case, in step S402 of FIG. 11, delay flag trainer 304 obtains a delay flag that is an output of delay flag classifier 123 obtained by inputting the scene image into delay flag classifier 123 of common NN 121. Then, in step S403 of FIG. 11, delay flag trainer 304 performs backward propagation computation on delay flag classifier 123 of common NN 121, using the delay flag correct answer label as reference data (teacher data), and updates the weight and bias of delay flag classifier 123. Further, for example, the same input data (input image) may be input into feature classifier 122 and delay flag classifier 123.

The input data of delay flag classifier 123 may be, for example, intermediate data of the inference of feature classifier 122. For example, NN inference unit 120 may cause feature classifier 122 to output intermediate data of the inference and input the intermediate data into delay flag classifier 123, thereby obtaining delay flag information that is an output of delay flag classifier 123.

In the above embodiment, an example has been described where the processing of the subsequent tasks is processing using NNs, and NN inference computation management unit 130 determines the computation order of the processing using NNs, but the present disclosure is not limited thereto. The processing of the subsequent tasks may be processing not using NNs, and NN inference computation management unit 130 may determine the computation order of the processing not using NNs.

In the above embodiment, an example has been described where the NPU is mounted on SoC 601 of device 100, but the NPU may not be mounted. Of CPU 602 and the NPU, only CPU 602 may be mounted on SoC 601, and for example, each processing described above may be executed by CPU 602.

In the above embodiment, an example has been described where NN inference processing unit 110 is used in the product field of IoT devices, but the product field is not limited thereto. NN inference processing unit 110 is also applicable in product fields different from IoT devices, such as autonomous vehicles, robots, and unmanned aerial vehicles like drones.

The order of the plurality of types of processing described in the above embodiment is an example. The order of the plurality of types of processing may be changed, or the plurality of types of processing may be executed in parallel. Some of the plurality of types of processing need not be executed.

Each of the components described in the embodiment may be achieved as software or may typically be achieved as a large-scale integrated circuit (LSI) that is an integrated circuit. The components may each be individually integrated into one chip or may be integrated into one chip so as to include some or all of them. The circuit is referred to as an LSI here but is sometimes referred to as an integrated circuit (IC), a system LSI, a super LSI, or an ultra-LSI, depending on the degree of integration. The method for making an integrated circuit is not limited to being achieved by an LSI but may be achieved by a dedicated circuit or a general-purpose processor. After the manufacturing of the LSI, a field programmable gate array (FPGA) that can be programmed, or a reconfigurable processor in which the connections and settings of circuit cells in the LSI can be reconfigured, may be used. Moreover, if an integrated circuit technology replacing the LSI appears due to the advance of semiconductor technology or another technology derived therefrom, the components may naturally be integrated using that technology.

The division of functional blocks in the block diagram is an example, and a plurality of functional blocks may be achieved as one functional block, one functional block may be divided into a plurality of functional blocks, or some functions may be transferred to other functional blocks. Functions of a plurality of function blocks with similar functions may be processed in parallel or in time division by a single piece of hardware or software.

The training apparatus provided in the information processing system may be achieved as a single apparatus or by a plurality of apparatuses. For example, each processing unit of the training apparatus may be achieved by two or more server apparatuses. When the information processing system is achieved by a plurality of server apparatuses, the components included in the information processing system may be distributed to the plurality of server apparatuses in any manner. A method for communication between the plurality of server apparatuses is not particularly limited.

Furthermore, the technique of the present disclosure may be a program for causing a computer to execute characteristic processing in the above information processing method or may be a non-temporary computer-readable recording medium on which the program is recorded. Needless to say, the program can be distributed via a transmission medium such as the Internet. For example, the program and a digital signal including the program may be transmitted via a telecommunications line, a wireless or wired communication line, a network represented by the Internet, data broadcasting, or the like. The program and the digital signal including the program may be executed by other independent computer systems by being recorded on a recording medium and transferred or by being transferred via the network or the like.

In the embodiments, each of the components may be formed of dedicated hardware or may be achieved by executing a software program suitable for each of the components. Each of the components may be achieved by a program executor, such as a central processing unit (CPU) or a processor, reading and executing a software program recorded on a recording medium such as a hard disk or a semiconductor memory.

INDUSTRIAL APPLICABILITY

The present disclosure is applicable to an information processing apparatus and the like using inference processing of a plurality of NNs.

The invention claimed is:

1. An information processing apparatus comprising:
an obtainer that obtains sensing data;
an inference processing unit that inputs the sensing data into an inference model to obtain a result of inference and information on a processing time for a plurality of subsequent tasks to processing performed by the inference model;
a determiner that determines a task schedule for a task processing unit that processes the plurality of subsequent tasks to process the plurality of subsequent tasks on a basis of the information on the processing time for the plurality of subsequent tasks; and
a controller that inputs the result of the inference into the task processing unit to process the plurality of subsequent tasks according to the task schedule determined, wherein
the result of the inference is a feature value of the sensing data output from a feature classifier,
the information on the processing time for the plurality of subsequent tasks is determined by estimating the processing time for the plurality of subsequent tasks from the feature value,
the feature classifier outputs the feature value to a delay flag classifier, and
the delay flag classifier outputs delay flag information indicating a time from when the feature value is input into each of a plurality of neural networks included in the task processing unit until when processing of the plurality of subsequent tasks ends.

2. The information processing apparatus according to claim 1, wherein
the inference model includes a first inference model and a second inference model,
the sensing data is input into the first inference model to obtain the result of the inference, and
the result of the inference obtained or intermediate data of the inference is input into the second inference model to obtain the information on the processing time for the plurality of subsequent tasks.

3. The information processing apparatus according to claim 1, wherein
the inference model includes a first inference model and a second inference model,
the sensing data is input into the first inference model to obtain the result of the inference, and
the sensing data is input into the second inference model to obtain the information on the processing time for the plurality of subsequent tasks.

4. The information processing apparatus according to claim 1, wherein
the information on the processing time for the plurality of subsequent tasks includes information on a delay relative to a predetermined time that is determined with respect to the processing time for the plurality of subsequent tasks.

5. The information processing apparatus according to claim 4, wherein
a first schedule is determined when information indicating that the delay is less than a predetermined value is included in the information on the delay, and
a second schedule, in which the processing time for the plurality of subsequent tasks is shorter than in the first schedule, is determined when information indicating that the delay is greater than or equal to the predetermined value is included in the information on the delay.

6. The information processing apparatus according to claim 5, wherein
the first schedule is determined using a first rule, and
the second schedule is determined using a second rule with which the processing time for the plurality of subsequent tasks in the second schedule is shorter than in the first schedule.

7. The information processing apparatus according to claim 1, wherein
the inference model executes inference processing that is preprocessing common to the plurality of subsequent tasks.

8. The information processing apparatus according to claim 1, wherein
the inference model and the task processing unit are neural network models,
the result of the inference is a feature value of the sensing data, and
the task schedule includes an order in which the task processing unit performs memory loading and the processing.

9. An information processing method executed by a computer, the information processing method comprising:
obtaining sensing data;
inputting the sensing data into an inference model to obtain a result of inference and information on a processing time for a plurality of subsequent tasks to processing performed by the inference model;
inputting the result of the inference into a task processing unit that processes the plurality of subsequent tasks to process the plurality of subsequent tasks;

measuring an inference time including a time from the inputting of the result of the inference into the task processing unit until an end of the processing of the plurality of subsequent tasks; and training the inference model by machine learning using the sensing data as input data, the information on the processing time for the plurality of subsequent tasks as output data, and the inference time measured as reference data, wherein the result of the inference is a feature value of the sensing data output from a feature classifier, the information on the processing time for the plurality of subsequent tasks is determined by estimating the processing time for the plurality of subsequent tasks from the feature value, the feature classifier outputs the feature value to a delay flag classifier, and the delay flag classifier outputs delay flag information indicating a time from when the feature value is input into each of a plurality of neural networks included in the task processing unit until when processing of the plurality of subsequent tasks ends.

10. A non-transitory computer-readable recording medium having recorded thereon a program for causing a computer to execute the information processing method according to claim 9.

11. The information processing apparatus according to claim 1, wherein the sensing data is an input image obtained from a camera.

12. The information processing apparatus according to claim 1, wherein the feature classifier includes a neural network.

13. The information processing apparatus according to claim 1, wherein the feature classifier outputs the sensing data to each of a plurality of neural networks included in the task processing unit, and each of the plurality of neural networks provided in parallel performs a subsequent process and produces a different output on a basis of the feature value.

14. The information processing apparatus according to claim 1, wherein the delay flag classifier includes a trained neural network.

15. The information processing apparatus according to claim 1, wherein the inference model includes:

a first inference model to which the sensing data is input and from which the result of the inference is output; and a second inference model to which the result of the inference, intermediate data of the inference, or the sensing data is input and from which the information on the processing time for the plurality of subsequent tasks is output, and an amount of calculation of the second inference model is smaller than an amount of calculation of the first inference model.

* * * * *